US012180757B2

(12) United States Patent
Wilke et al.

(10) Patent No.: US 12,180,757 B2
(45) Date of Patent: Dec. 31, 2024

(54) ACTUATING DEVICE FOR A DOOR LOCK OF A VEHICLE DOOR

(71) Applicant: ILLINOIS TOOL WORKS INC., Glenview, IL (US)

(72) Inventors: Zsolt Wilke, Bad Mergentheim (DE); Andreas Rudolf, Eibelstadt (DE); Roland Och, Rottendorf (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 332 days.

(21) Appl. No.: 17/535,293

(22) Filed: Nov. 24, 2021

(65) Prior Publication Data

US 2022/0170298 A1 Jun. 2, 2022

(30) Foreign Application Priority Data

| | | |
|---|---|---|
| Nov. 27, 2020 | (DE) | 10 2020 131 538.4 |
| Feb. 3, 2021 | (DE) | 10 2021 102 531.1 |
| Mar. 25, 2021 | (DE) | 10 2021 107 574.2 |
| Apr. 1, 2021 | (DE) | 10 2021 108 358.3 |
| Jul. 16, 2021 | (DE) | 10 2021 118 452.5 |

(51) Int. Cl.

| | |
|---|---|
| ***E05B 85/10*** | (2014.01) |
| ***E05B 77/42*** | (2014.01) |
| ***E05B 85/16*** | (2014.01) |

(52) U.S. Cl.
CPC ............ *E05B 85/107* (2013.01); *E05B 77/42* (2013.01); *E05B 85/103* (2013.01); *E05B 85/16* (2013.01)

(58) Field of Classification Search
CPC ........ E05B 85/10; E05B 85/16; E05B 85/103; E05B 85/107; E05B 77/42
See application file for complete search history.

(56) References Cited

U.S. PATENT DOCUMENTS

| | | | | |
|---|---|---|---|---|
| 2002/0013980 | A1* | 2/2002 | Bella | E05B 77/42 16/412 |
| 2019/0283555 | A1* | 9/2019 | Couto Maquieira | E05B 85/107 |
| 2021/0404227 | A1* | 12/2021 | Rhein | E05B 81/90 |
| 2022/0018167 | A1* | 1/2022 | Rocci | E05B 85/103 |

FOREIGN PATENT DOCUMENTS

| | | |
|---|---|---|
| DE | 19731325 A1 | 1/1999 |
| DE | 29804105 U1 | 7/1999 |

* cited by examiner

*Primary Examiner* — Eugene G Byrd
*Assistant Examiner* — Emily G. Brown
(74) *Attorney, Agent, or Firm* — THOMPSON HINE LLP

(57) ABSTRACT

An actuating apparatus for a door lock of a vehicle door, in particular as part of a door handle arrangement of a vehicle door, wherein the actuating apparatus has a handle part that is grippable by a hand and is configured in order to be transferable between a resting position and a ready position, and wherein the handle part is manually movable from the ready position into an actuating position and is in particular pivotably or linearly extendable, wherein the actuating apparatus is configured in order to actuate the door lock when the handle part reaches or has reached the actuating position. The actuating apparatus has a blocking and/or delay mechanism, which cooperates with the handle part such that the handle part is transferable from the ready position back into the resting position only with a time delay and/or only in an at least partially braked or dampened manner.

15 Claims, 24 Drawing Sheets

ACTUATING DEVICE FOR A DOOR LOCK OF A VEHICLE DOOR

TECHNICAL FIELD

The present invention relates generally to door handle arrangements for a vehicle, preferably for a side door of a vehicle, and in particular to an exterior door handle arrangement, although it may also be an interior door handle arrangement or an arrangement having both an interior and exterior door handle or an (interior and/or exterior) door handle arrangement for a trunk lid.

In particular, the invention relates to an actuating apparatus for a door lock of a vehicle door, in particular a side door of a vehicle, and in particular an actuating apparatus that is part of a door handle arrangement for a vehicle. The actuating apparatus is in particular an actuating apparatus for a door lock of an exterior door handle arrangement.

The actuating apparatus has a handle part, which can be gripped by a hand, wherein this handle part is used for actuating the door lock of the vehicle door. The handle part is preferably connected via a mechanism to a handle support (for example, a handle housing) which is fixed/fixable to the door.

BACKGROUND

Door handle arrangements or actuating apparatuses of the type according to the present invention are used in vehicles in order to open and close doors or flaps that are arranged in car body openings.

The door handle arrangement or actuating apparatus according to the invention is in particular a door handle arrangement or actuating apparatus in which the handle part configured as a door handle can actuate a corresponding door lock, preferably purely mechanically, for example with the assistance of a Bowden cable or with the assistance of other force transfer elements during actuation of the handle part.

In particular, it is provided in the actuating apparatus according to the invention that the handle part can be moved from a flush, and in particular an exactly flush, resting position into an exposed working position. The handle part can be moved by means of external actuation from the flush and, in particular the exactly flush, resting position into the exposed working position, wherein, however, the handle part is preferably manually actuated from the flush resting position/resting position into the exposed working position/working position.

Such an exactly flush door handle, which is also sometimes referred to as a "flush handle," is to be understood as a handle part whose surface in the resting position lies in a plane with the car body part surrounding the handle part.

In order for the handle part to be grippable by a user, it must either be externally actuated, for example by means of a mechanism, in particular by means of a mechanism driven by an engine, or manually moved from the resting position into the exposed working position.

An actuating apparatus or door handle arrangement of the type considered herein is disclosed, for example, in publication DE 197 31 325 A1. Here, the handle part for opening the door is arranged in such a way that the outside of the handle part in its not-in-use position runs approximately flush with the outer contour of the door (exactly flush) and that the handle part can be transferred into an opening position for opening the door in which it projects against the outer contour of the door. In so doing, a control unit can shift the handle part into the opening position by means of an external force.

On the other hand, the publication DE 298 04 105 U1 describes a handle part for doors and flaps of vehicles, having a handle body, which can be pivoted by motor out of a pivoted-in position into a pivoted-out position, having a sub-handle zone, which lies in an inaccessible hidden position in the pivoted-in position and is only accessible in the pivoted-out position.

With a handle part of a vehicle door handle arrangement, which is in particular manually movable from a flush, and in particular an exactly flush, resting position into an exposed working position, there is a risk that a finger or multiple fingers of the operator of the door handle arrangement may become clamped between the handle part and the vehicle body when, during the transition into the exposed working position of the handle part, the handle part is at least partially gripped by the operator's hand and—for whatever reason—the handle part is transferred back into its resting position.

In such a case, in conventional door handle arrangements or actuating apparatuses for door handle arrangements, the handle part would transfer out of the exposed working position or at least out of the partially exposed working position immediately back into the exactly flush resting position, thereby clamping the fingers or at least the one finger of the operator between the rear side of the handle part and the vehicle body.

This problem is shown schematically in FIG. 1, namely by way of a handle part 4, which is connected to the vehicle body or vehicle door 3 about a pivot axis 8 in an articulated manner.

Here, the handle part 4 serves to actuate a door lock of the vehicle door 3 as needed, wherein, in a resting position (position A), the handle part 4 is preferably arranged at least substantially flush with a surface of the vehicle door 3, and wherein, in a ready position (position C), the handle part 4 preferably projects at least in regions further from the vehicle door 3 than in the resting position.

In the ready position (position C), the partially exposed handle part 4 can be gripped on the longer lever arm of the handle part 4 in order to move the handle part 4 from the ready position according to position (C) into an actuating position according to position (D).

An embodiment in which the handle part 4 is connected to the vehicle body or vehicle door 3 about a pivot axis 8 in an articulated manner is shown in FIG. 1.

However, in a figurative sense, the following embodiments also apply for a corresponding handle part 4 which is preferably present in both the ready position (C) as well as the actuating position (D) at least substantially parallel to the outer shell of the vehicle or parallel to the outer shell of the vehicle door 3, and in particular exactly parallel to the outer shell of the vehicle/the vehicle door 3, wherein the handle part 4 is preferably associated with a kinematics for this purpose, which is configured in order to translate a rotating movement generated by an actuator, in particular an electromotor actuator, into a linear movement of the handle part 4.

In detail, a handle part 4 at position (A) in a in particular exactly flush resting position is schematically shown in FIG. 1. As already noted, here, the handle part 4 is connected to the vehicle body 3 about a pivot axis 8 in an articulated manner.

In the scenario shown in FIG. 1, in order to actuate the handle part 4 out of the exactly flush resting position shown in position (A), in particular, a force must be applied manually on the shorter lever arm of the handle part, as indicated schematically in position (B) and position (C) in FIG. 1.

Through the application of a force on the shorter lever arm of the handle part 4, the handle part 4 is pivoted about its rotational or pivot axis 8 relative to the vehicle body 3 and brought into an exposed working position.

According to another embodiment, not shown in the drawings, the handle part 4 is moved linearly relative to the vehicle body 3 and brought into an exposed working position.

Specifically, in position (C) in FIG. 1, the ready position of the handle part 4 is shown. In the ready position, the outer end region of the longer lever arm of the handle part 4 preferably projects a maximum of 40 mm from the vehicle body 3.

In the ready position, the partially exposed handle part 4 on the longer lever arm of the handle part 4 can be gripped in order to bring the handle part 4 from the ready position according to position (C) into the actuating position according to position (D). Here, the actuating apparatus is configured in order to actuate the door lock of the vehicle door 3 when the handle part 4 reaches or has reached the actuating position (position D).

In detail, in the position (D) of FIG. 1, an exposed working position of the handle part 4 is shown, in which the door lock can be unlocked and the vehicle door 3 can be opened. In particular, the handle part 4 is in such an exposed working position that at least the longer lever arm of the handle part 4 is grippable by the hand of the operator at least in regions.

In position (E) in FIG. 1, a situation is shown in which the operator's finger, which grips the longer lever arm of the handle part 4 at least in regions, can be clamped between the handle part 4 and the vehicle body 3, namely when attempting to quickly transfer the handle part 4 back into its exactly flush resting position, position (A), starting from the position (D).

On the other hand, when the handle part 4 is released starting from the working position shown in position (D), it moves back into the resting position according to position (F) due to a resetting force.

SUMMARY

Based on the above-described situation, the present invention is based in particular on addressing the problem of minimizing or even eliminating the risk of injury in manually actuatable door handle arrangements, in particular of the type described above.

For this purpose, it is provided in particular according to the present invention that the door handle arrangement has a clamping protection, with which, in a in particular easily to implementable but nevertheless effective manner, an accidental clamping of the operator's fingers between the handle part and the vehicle body when the handle part is pivoted back from an exposed working position into the exactly flush resting position can be effectively prevented.

The clamping protection is in particular part of the actuating apparatus of the door handle arrangement.

According to the invention, the actuating apparatus has a handle part that is grippable by a hand, wherein the handle part is configured in order to be transferable between a resting position and a ready position, and wherein the handle part is manually movable into an actuating position proceeding from the ready position, wherein the actuating apparatus is configured in order to actuate the door lock when the handle part reaches or has reached the actuating position.

In this context, in order to implement the desired clamping protection, it is provided in particular that the actuating apparatus has a blocking and/or delay mechanism, which cooperates with the handle part such that the handle part is transferable from the ready position back into the resting position only with a time delay and/or only in an at least partially braked or dampened manner.

By providing such a blocking and/or delay mechanism, a clamping protection is effectively provided, because this measure prevents the handle part from transitioning into the resting position in position (E) of FIG. 1 in a way that clamps the operator's fingers.

Preferably, the blocking and/or delay mechanism is constructed purely mechanically in order to increase the reliability of the clamping protection and reduce the construction costs.

According to preferred implementations of the actuating apparatus, the blocking and/or delay mechanism is configured in order to compel a non-uniform sequence of movement upon the handle part from the ready position back into the resting position on a purely mechanical basis during the return movement of the handle part.

In particular, the blocking and/or delay mechanism is configured in order to compel a non-uniform sequence of movement upon the handle part from the ready position back into the resting position during the return movement of the handle part, in such a manner that the return movement is initially, and in particular in a predetermined or determinable period of time, delayed with respect to its sequence, namely in comparison to a subsequent sequence of movement of the handle part.

A variety of different embodiments can be used in order to implement the blocking and/or delay mechanism:

For example, the blocking and/or delay mechanism can cooperate with the door handle such that it is transferred from the working position back into the resting position only with a time delay and/or only in an at least partially braked or dampened manner.

For example, it is conceivable that the blocking and/or delay mechanism has at least one damping device that acts in a motion-dampening manner upon a return movement of the handle part at least temporarily during a return movement of the handle part from its ready position or actuating position back into its resting position.

For example, here, the blocking and/or delay mechanism can be in particular configured such that the damping device enters, at least temporarily, into an operative connection with the handle part only from a predetermined or determinable position in order to act upon the return movement of the handle part in a motion-damping manner.

Alternatively or additionally, it is conceivable that the blocking and/or delay mechanism is configured in order to at least temporarily increase a contact surface via which the damping device cooperates with the handle part in order to act in a motion-dampening manner upon a return movement of the handle part only from a predetermined or determinable position of the handle part.

Alternatively or additionally, it is contemplated that the blocking and/or delay mechanism has a blocking device that at least temporarily blocks a return movement of the handle part during the return movement of the handle part from its ready position back into its resting position.

For example, the blocking and/or delay mechanism can be configured such that the blocking device enters at least temporarily into an operative connection with the handle part only from a predetermined or determinable position of the handle part in order to at least temporarily block a return movement of the handle part.

Alternatively or additionally, it is conceivable that the blocking and/or delay mechanism has a braking device, which, at least temporarily, has a braking effect on a return movement of the handle part during the backwards movement of the handle part from its ready position into its resting position.

For example, here, the blocking and/or delay mechanism can be in particular configured such that the braking device enters, at least temporarily, into an operative connection with the handle part only from a predetermined or determinable position of the handle part in order to act upon the return movement of the handle part in a motion-damping manner.

However, in order to compel the return movement of the handle part from the ready position back into the resting position in such a non-uniform sequence of movement, event-controlled solutions are also conceivable as an alternative to the time-controlled solutions described above.

According to embodiments of the actuating apparatus according to the invention, it is thus provided that a manipulator is associated with the door device, which manipulator can be moved between a released position in which the door lock is unlocked and a neutral position in which the door lock is locked.

With regard to the blocking and/or delay mechanism, it is in particular provided that the latter has a control element designed in particular at least in regions as a cam disk, which is configured in order to interact with the handle part at least during the return movement of the handle part from the ready position back into the resting position in such a way that a non-uniform sequence of movement is compelled upon the handle part. The manipulator associated with the door lock may be configured in order to interact with the control element in its released position, wherein the interaction with the control element is suspended in the neutral position of the manipulator.

According to implementations of the actuating apparatus according to the invention, it is provided that the control element is pivotably mounted about a first pivot axis relative to the handle part, wherein the handle part is pivotably mounted about a second pivot axis extending in particular parallel to the pivot axis of the control element relative to the vehicle door, wherein the control element is coupled or operatively connected to the handle part via a gear element or a gear mechanism such that, during a pivoting movement of the handle part about the second pivot axis caused in order to transfer the handle part from the resting position into the ready position, the control element is transferred from a starting position into a ready position by way of a pivoting of the control element about the first pivot axis. Here, the manipulator associated with the door lock is configured such that it permits, in its released position, the transfer of the control element from the starting position into the ready position but blocks a pivoting or rotating movement of the control element about the first pivot axis that is necessary for the transfer of the control element from the ready position back into the starting position, In this context, it is conceivable that the manipulator associated with the door lock is configured such that, in its released position, it forms a pawl with the control element, such that a pivoting or rotating movement of the control element about the first pivot axis, which is necessary for the transfer of the control element from the starting position into the ready position, is made possible, but a pivoting or rotating movement of the control element about the first pivot axis, which is necessary for the transfer of the control element from the ready position back into the starting position, is blocked.

According to implementations of this aspect, it is provided that the manipulator associated with the door lock is configured in such a way that, in its released position, it forms a mold pawl with the control element, in particular a tooth pawl or bar pawl and/or a friction pawl.

Alternatively or additionally, it is conceivable that the manipulator associated with the door lock is in particular configured as a blocking element, and wherein the control element has a blocking projection with a stop, wherein, in the released position, the manipulator configured as a blocking element abuts against the stop and blocks a pivoting or rotating movement of the control element about the first pivot axis, which is necessary for the transfer of the control element from the ready position back into the starting position.

According to implementations of this aspect, it is provided that the blocking projection of the control element has a first, in particular flat, flank region and an opposing second, in particular steep, flank region, wherein the second, in particular steep, flank region defines the stop, and wherein the control element and/or the manipulator configured as a blocking element are configured such that, when the control element is transferred from the starting position into the ready position, the manipulator configured as a blocking element slides over the first, in particular flat, flank region of the blocking projection of the control element, while the manipulator configured as a blocking element, when attempting to rotate backwards, hits against a second, in particular steep, flank region, forms a positive lock with the latter, and blocks the pivoting or rotating movement of the control element about the first pivot axis, which necessary for the transfer of the control element from the ready position back into the starting position.

In this context, for example, it is conceivable that the control element and/or the manipulator configured as the blocking element are configured such that when the control element is transferred from the starting position into the ready position, the control element is movable along the first pivot axis relative to the manipulator configured as the blocking element.

According to implementations of the actuating apparatus according to the invention, it is provided that the manipulator associated with the door lock is configured as a blocking element that can be retracted and extended parallel to the first pivot axis relative to the control element, wherein the blocking element is in its retracted state in the neutral position of the manipulator and in its extended state in the released position of the manipulator.

According to a preferred implementation of the blocking and/or delay mechanism, the blocking and/or delay mechanism has a damping device that acts at least temporarily during the return movement of the handle part from the ready position back into the resting position in a motion-damping or braking manner on the return movement of the handle part.

In this context, it is in particular suitable when the blocking and/or delay mechanism is configured such that the damping device enters, at least temporarily, into an operative connection with the handle part only from a predetermined or determinable position of the handle part in order to act upon the return movement of the handle part in a motion-damping or motion-braking manner.

According to preferred implementations and further developments of the last-mentioned implementation of the actuating apparatus according to the invention, the blocking and/or delay mechanism has a control element, which is configured in particular as a cam disk, at least in regions. The control element, which is designed in particular at least in regions as a cam disk, is configured in order to interact with the handle part during the return movement of the handle part from the ready position back into the resting position such that a non-uniform sequence of movement is compelled upon the handle part.

In particular, the handle part is compelled to have a non-uniform sequence of movement such that the return movement is initially delayed, in particular in a predetermined or determinable period of time, with respect of its sequence in comparison to a subsequent sequence of movement of the handle part.

According to preferred further developments of the last-mentioned embodiment, it is provided that the control element is pivotably mounted about a first pivot axis relative to the handle part. Here, the handle part is pivotably mounted about a second pivot axis, which extends in particular parallel to the pivot axis of the control element, relative to the vehicle door or relative to a housing of the door handle arrangement.

The control element is preferably coupled or operatively connected to the handle part via a gear element or via a gear mechanism such that, during a pivoting movement of the handle part about the second pivot axis caused in order to transfer the handle part from the resting position into the ready position, the control element is transferred from a starting position into a ready position by way of a pivoting of the control element about the first pivot axis.

In this context, it is conceivable, for example, that the gear element or the gear mechanism is configured in order to, upon or after reaching the ready position of the control element, suspend or at least interrupt the coupling or operative connection between the control element and the handle part such that, during a pivoting movement of the handle part about the second pivot axis caused in order to transfer the handle part from the ready position into the actuating position, the control element is not further and/or no longer pivoted about the first pivot axis.

According to embodiments of the actuating apparatus according to the invention, it is provided in this context that the gear element or the gear mechanism is further configured in order to hold the control element in the ready position when the handle part is further pivoted out of the ready position into the actuating position and vice versa upon or after reaching the ready position of the control element.

As the gear element or the gear mechanism, various embodiments may be considered.

According to implementations of the actuating apparatus according to the invention, it is provided in this context that the gear element is configured as a gear element of a slotted control system, or the gear mechanism is at least partially configured as a slotted control system. The slotted control system preferably has a slotted guide, in particular in the form of a slotted guide surface, which is configured in order to forcibly guide a slotted region of the handle part associated with the slotted control system and operatively connected to the handle part according to the slotted guide.

Of course, however, other embodiments for the gear element or gear mechanism may also be considered.

In particular, preferably the control element is configured at least in regions as a cam disk having a non-uniform edge region. On the other hand, in this context, the handle part has a lever region fixedly connected to the handle part, wherein the lever region is configured in order to pick up the movement the non-uniform edge region of the cam disk resulting from the rotation or pivoting movement of the cam disk about the first pivot axis during the movement of the control element from the ready position into the starting position, such that the sequence of movement of the handle part is controlled by the control element accordingly during the movement of the control element from the ready position into the starting position.

The blocking and/or delay mechanism is preferably configured such that a contact between the lever region of the handle part and the non-uniform edge region of the cam disk is suspended upon or after reaching the ready position of the control element, in particular during a further movement of the handle part from the ready position of the handle part into the actuating position.

In order to design the cam disk mechanism described above to be as wear-free as possible, the lever region of the handle part preferably has a guide roller or a guide wheel, via which a movement of the non-uniform edge region of the cam disk is picked up during the movement of the control element from the starting position into the ready position and back, In order to protect the guide roller or the guide wheel from an overload, the guide roller or the guide wheel is preferably elastically, in particular spring-elastically, mounted at least in regions in the lever region of the handle part, such that, when a in particular predetermined or determinable critical force is applied to the guide roller or the guide wheel via the edge region of the cam disk, the roller or wheel can be pressed into the lever region.

However, alternatively or additionally, it is also conceivable that the guide roller or the guide wheel is mounted at least in regions in the lever region of the handle part and has an axis as well as an outer roller surface arranged coaxially and/or concentrically to the axis, said roller surface being connected to the axis elastically, in particular spring-elastically, such that, when a in particular predetermined or determinable critical force is applied to the guide roller or the guide wheel via the edge region of the cam disk, the outer roller surface of the guide roller or guide wheel can be pressed into the lever region at least in regions.

In order to delay the return movement of the handle part from the ready position into the resting position in terms of time, the blocking and/or delay mechanism preferably has a braking device associated with the control element, which device is configured in order to brake a pivoting movement of the control element while pivoting about the first pivot axis.

In order implement the braking device, it can be provided that it has a rotating damper, which preferably is or can be brought into operative connection with the control element via a gear, in particular a cogwheel, such that at least a pivoting movement of the control element from the ready position of the control element into the starting position of the control element is braked.

In order to also delay/brake a return movement of the control element or the handle part, i.e. a movement from the starting position into the ready position, the rotating damper can be configured in order to brake rotationally on both sides.

According to further developments of the actuating apparatus according to the invention, the blocking and/or delay mechanism has an overload protection associated with the control element, which protection is configured in order to suspend the contact between the lever region of the handle part and the control element, and in particular the contact between the lever region of the handle part and the non-uniform edge region of the region of the control element configured as a cam disk, during a return movement of the handle part from the ready position back into the resting position, when a in particular predetermined or determinable critical force is applied to the handle part.

For as-needed suspension of the contact between the lever region and the control element, the control element is preferably slidable relative to the lever region along the first pivot axis.

In this context, for example, it can be provided that the non-uniform edge region of the cam disk and an edge region of the lever region of the handle part provided with the edge region of the cam disk for picking up a movement of the cam disk are configured to run diagonally such that, upon exceeding critical force that is exerted by the handle part and the lever region on the edge region of the cam disk and is in particular predetermined or determinable, the overload protection is activated and the control element is slid along the first pivot axis relative to the lever region for the as-needed suspension of the contact between the lever region and the control element.

Of course, other embodiments for the implementation of the overload protection can also be considered.

Preferably, a biasing element, in particular in the form of a spring element, is associated with the handle part in order to bias the handle part into the resting position of the handle part. In particular, it can be provided in this context that the biasing element is configured as a leg spring. Of course, other embodiments can also be considered here.

On the other hand, a (further) biasing element, in particular in the form of a spring element, is preferably associated with the control element in order to bias the control element into the starting position of the control element. The biasing element is in particular configured as a leg spring, which is also compressible in its longitudinal direction.

The invention further relates to a door handle arrangement for a vehicle door, wherein the door handle arrangement has an actuating apparatus of the manner according to the invention described above.

In addition, the present invention relates to a vehicle door having a door handle arrangement or actuating apparatus for actuating a door lock of the vehicle door as needed.

In the resting position of the handle part, the handle part is arranged at least substantially flush with a surface of the vehicle door when the actuating apparatus is installed in the vehicle door. In the ready position, when the actuating apparatus is installed in the vehicle door, the handle part projects at least in regions from the vehicle door further than in the resting position.

According to the embodiments of the vehicle door according to the invention, the handle part is present in both the ready position as well as the actuating position at least substantially parallel to the outer shell of the vehicle, and in particular exactly parallel to the outer shell of the vehicle, wherein the handle part is preferably associated with a kinematics for this purpose, which is configured in order to translate a rotating movement generated by an actuator, in particular an electro-motor actuator, into a linear movement of the handle part.

BRIEF DESCRIPTION OF THE DRAWINGS

Exemplary embodiments of the solution according to the invention are described in further detail below with reference to the accompanying drawings.

The following are shown.

DETAILED DESCRIPTION

Figure 1:
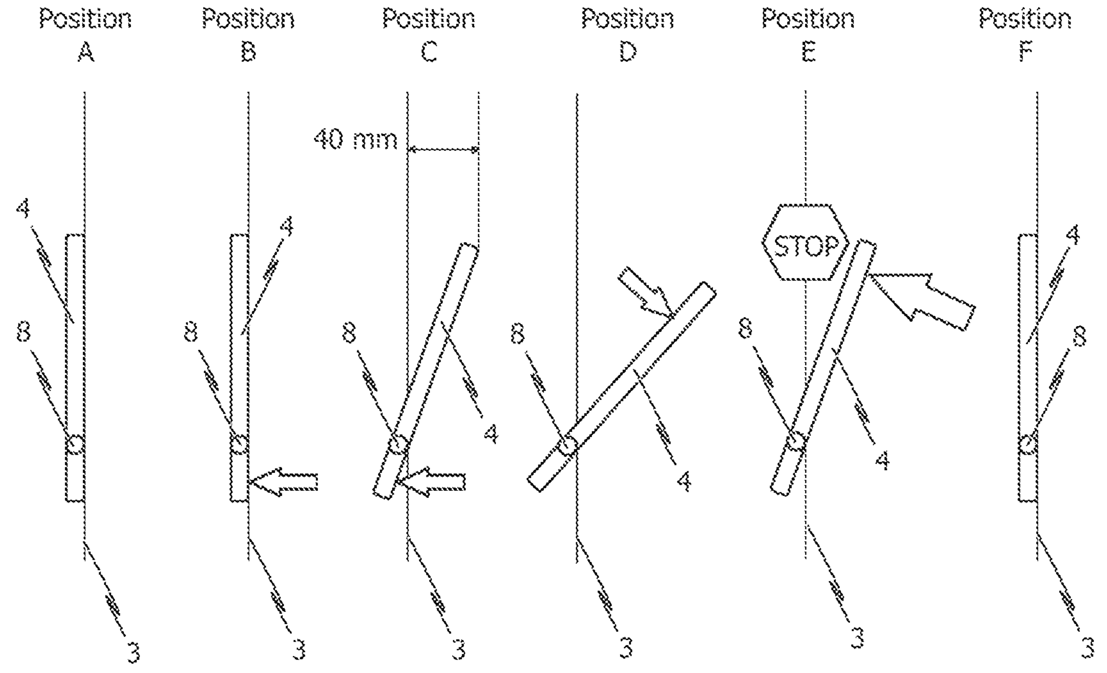
FIG. 1 schematically, the sequence of movement during the in particular manually actuated transfer of a handle part of a vehicle door from a flush, and in particular exactly flush, resting position into an exposed working position and from the exposed working position back into the exactly flush resting position.

Unless otherwise indicated, the same reference numerals in the enclosed figures refer to the same or functionally similar objects.

In FIG. 1, the sequence of movement of a handle part 4 of a door handle arrangement 1 is shown schematically, in which the handle part 4 of the door handle arrangement 1 is in an exactly flush resting position (position A), in particular. The handle part 4 is connected to the vehicle body 3 via, for example, a housing of the door handle arrangement 1 (not shown) about a pivot axis 8 in an articulated manner.

In order to actuate the handle part 4 out of the exactly flush resting position shown in position (A), a force must in particular be applied manually on the shorter lever arm of the handle part 4, as indicated schematically in position (B). Through the application of a force to the shorter lever arm of the handle part 4, the latter is pivoted about its rotational or pivot axis 8 relative to the vehicle body 3 and brought into an exposed working position, the so-called ready position (C).

In the position (D) of FIG. 1, an exposed working position of the handle part 4 is shown. In this exposed working position, the door lock to be actuated with the handle part 4 is unlocked, and the vehicle door 3 can be opened or is opened. In particular, the handle part 4 is in such an exposed working position that at least the longer lever arm of the handle part 4 is grippable by the hand of the operator at least in regions.

In position (E) in FIG. 1, a situation is shown in which the operator's finger, which grips the longer lever arm of the handle part 4 at least in regions, can be clamped between the handle part 4 and the vehicle body 3, namely when the handle part 4 is quickly transferred back into its exactly flush resting position, position (F), starting from the position (D).

In order to minimize, and in particular to exclude, this risk of injury, a clamping protection is proposed according to the invention, with which an unintended clamping of the operator's fingers between the handle part 4 and the vehicle body 3 can be effectively prevented when the handle part 4 is pivoted backwards out of the ready position into the exactly flush position.

Embodiments of the clamping protection are described in more detail below with reference to FIG. 2 to FIG. 44.

In these drawings, a door handle arrangement 1 with an actuating apparatus 2 for a door lock of a vehicle door 3 is shown, wherein the actuating apparatus 2 has a handle part 4 that can be gripped with a hand.

The handle part 4 is in particular manually transferable between a resting position and a ready position. Starting from the ready position, the handle part 4 is manually movable into an actuating position, wherein the actuating apparatus 2 is configured in order to actuate the door lock (not shown in the drawings) when the handle part 4 reaches or has reached the actuating position.

In the resting position, the handle part 4 is preferably arranged at least substantially flush with a surface of the vehicle door 3 when the actuating apparatus 2 is installed in the vehicle door 3.

In the ready position, when the actuating apparatus 2 is installed in the vehicle door 3, the handle part 4 projects at least in regions from the vehicle door 3 further than in the resting position.

The ready position is preferably a position in which the handle part 4 is or can be kept relaxed by means of a blocking and/or delay mechanism. In the ready position, the handle part 4 is manually grippable or better grippable than in the resting position.

However, it is preferably also possible to grip the handle part 4 in the resting position and manually pull it into the ready position and then into the actuating position. In the ready position, when the actuating apparatus 2 is installed in the vehicle door 3, the handle part 4 projects at least in regions from the vehicle door 3 further than in the resting position.

The actuating apparatus 2 can be fixed, for example screwed, to the body part of a vehicle body 3 via a housing of the door handle arrangement 1 (not shown in the drawings). For example, the vehicle can be a car or a truck.

The body part may be made of a metal, for example steel or aluminum. It can be a sheet metal body part. However, the body part can also be made of plastic. This generally applies to the entire vehicle body 3. The body part can itself form part of the exterior surface of the vehicle. However, it is also conceivable that this is a body part that is attached to a further body part forming a part of the exterior surface of the vehicle. The body part and, optionally, the further body part have a body cut-out in which the door handle arrangement 1 is employed with the actuating apparatus 2 such that the handle part 4 is accessible from the outside in the mounted state.

On the one hand, the handle part 4 is movably mounted in the housing for unlocking and/or opening the vehicle door 3. The handle part 4 is mounted in particular between a resting position located in the housing, which corresponds to the closed state of the door handle arrangement 1 or vehicle door 3, and a ready position/actuating position that is moved out of the housing.

For example, for this purpose, the handle part 4 can be pivotably mounted in the housing. The unlocking of the vehicle door 3 can be purely mechanical, electrical, or also electrical and redundantly mechanical.

If the unlocking is exclusively electrical, the pivoting of the handle part 4 out of the resting position into the actuating position serves only to pull the door that has already been unlocked and, if necessary, to actuate the electrical unlocking. The door can also be pre-opened electrically via a low opening path.

The actuating apparatus 2 has a blocking and/or delay mechanism, which cooperates with the handle part 4 such that the handle part 4 is transferable from the ready position back into the resting position only with a time delay and/or only in an at least partially braked or dampened manner.

In particular, the blocking and/or delay mechanism is configured in order to compel a non-uniform sequence of movement upon the handle part 4 from the ready position back into the resting position on a purely mechanical basis during the return movement of the handle part 4. In this case, the return movement is initially delayed with respect to its sequence in comparison to a subsequent sequence of movement of the handle part 4.

With reference to the illustrations in FIG. 2 to FIG. 5, a first exemplary embodiment of the blocking and/or delay mechanism are described below in more detail.

Figure 2:
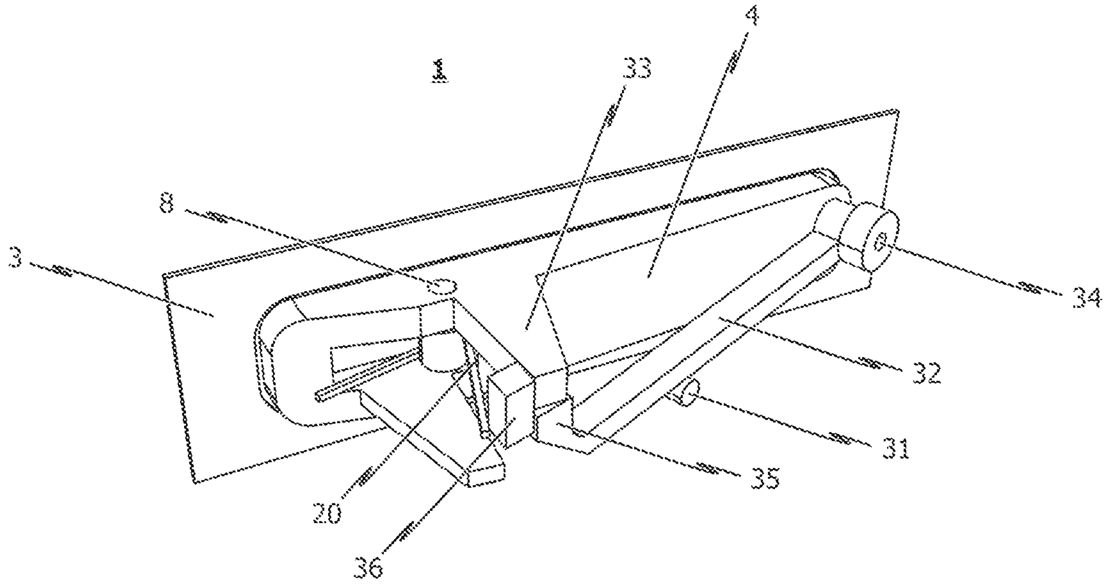
FIG. 2 schematically and in an isometric view, a door handle arrangement having a first exemplary embodiment of the actuating apparatus according to the present invention for a door lock of a vehicle door, wherein the handle part of the actuating apparatus is in a resting position.
Figure 3:
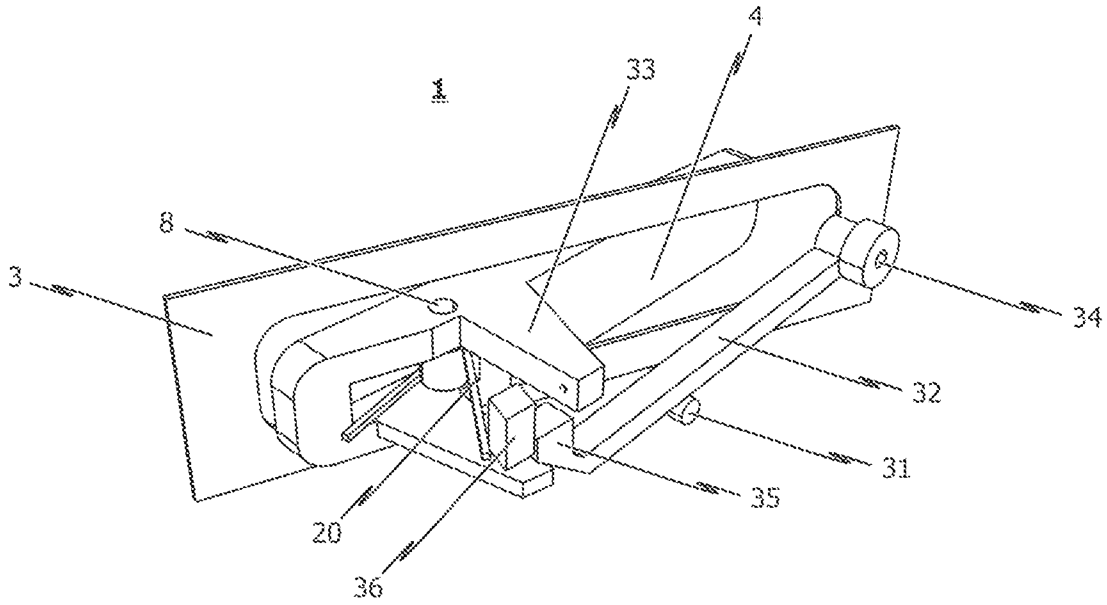
FIG. 3 schematically and in an isometric view, the door handle arrangement according to FIG. 2, wherein the handle part of the actuating apparatus is transferred/pivoted out of the resting position according to FIG. 2 into a ready position through the application of a force on the shorter lever arm of the handle part.

In detail, in FIG. 2, a door handle arrangement 1 having the blocking and/or delay mechanism is shown in a state in which the handle part 4 of the actuating apparatus is in a resting position. FIG. 3 schematically shows the door handle arrangement 1 according to FIG. 2, wherein the handle part 4 is transferred/pivoted out of the resting position according to FIG. 2 into a ready position through the application of a force on the shorter lever arm of the handle part 4.

Figure 4:
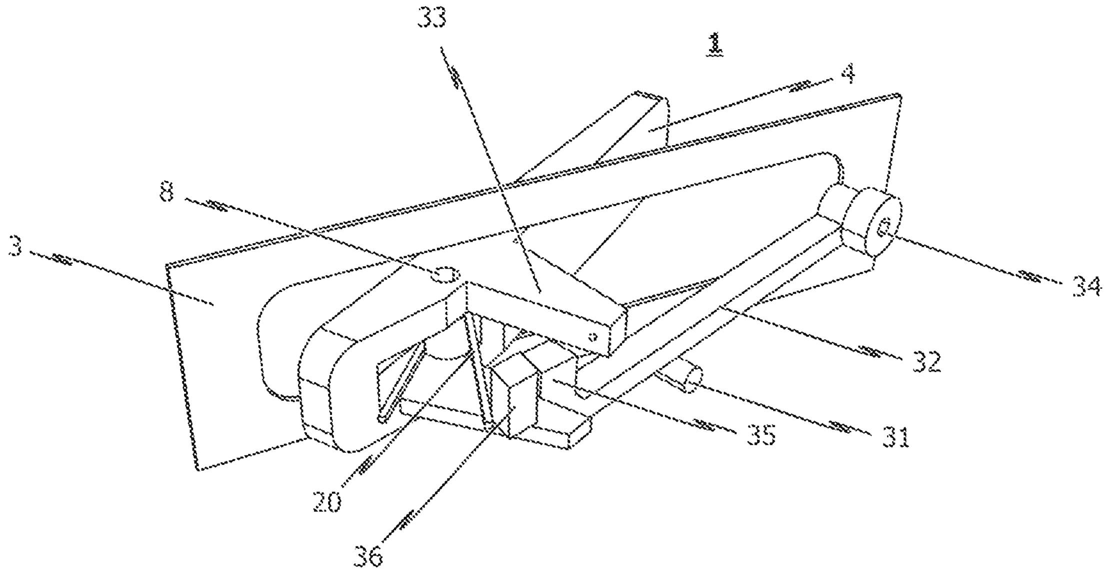
FIG. 4 schematically and in an isometric view, the door handle arrangement according to FIG. 3, but in a state in which the handle part is moved manually from the ready position according to FIG. 3 into the actuating position.

FIG. 4, schematically and in an isometric view, shows the door handle arrangement 1 according to FIG. 3 in a state in which the handle part 4 is manually moved out of the ready position according to FIG. 3 into the actuating position.

In the first concept of the present invention shown schematically in FIG. 2 to FIG. 5, a biasing element 20 in the form of a leg spring is associated with the handle part 4 in order to bias the handle part 4 into the resting position of the handle part according to FIG. 2.

The blocking and/or delay mechanism used in this case has a lever 32 mounted about a pivot axis 31 in a rocker-like manner, wherein the pivot axis 31 extends perpendicular to the pivot axis 8, about which the handle part 4 is pivotable relative to the vehicle door 3.

The rocker-like lever 32 has a first end region and an opposite second end region, wherein the first end region of the lever 32 is arranged in the region of the pivot axis 8 of the handle part 4. The lever 32 is mounted such that it abuts a lever region 33 of the handle part 4 from below with its first end region due to the gravitational force. For this purpose, a corresponding weight 34 can be attached to the second end region of the lever 32 in order to press the lever 32 from below against the lever region 33 of the handle part.

In place of such a “gravitational” biasing of the lever 32, a corresponding spring element can also be used in order to press the first end region of the lever 32 against the lever region 33 of the handle part 4.

A corresponding, in particular block-like, contact region 35 is formed at the first end region of the rocker-like mounted lever 32. This region stands in a frictional connection with an in particular elastic damper 36.

When, as shown in FIG. 3, the handle part 4 is pivoted out of the resting position according to FIG. 2 into the ready position through the application of a force on the shorter lever arm of the handle part 4, the lever region 33 of the handle part 4 is also pivoted such that the first end region of the rocker-like lever 32 is no longer in contact with the (bottom) of the lever region 33.

Due to the rocker-like mounting of the lever 32 and the gravitational biasing of the lever 32, the lever 32 can move about the pivot axis 31 such that the first end region of the lever 32, and in particular the block-like contact region 35, moves upwards along the damper 36. This position is shown in FIG. 4.

Figure 5:
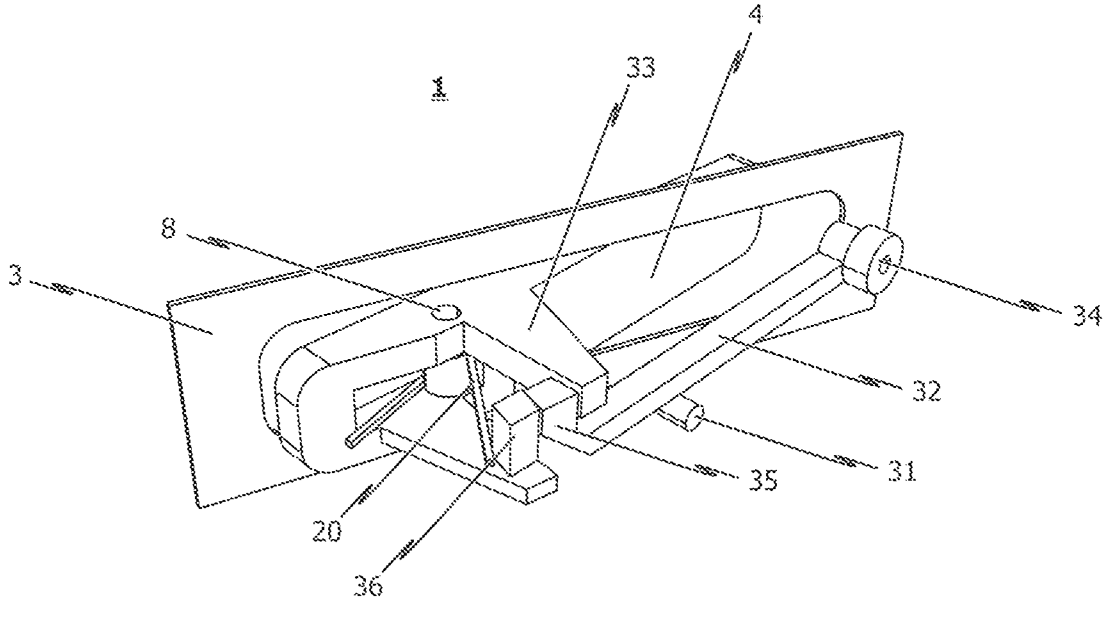
FIG. 5 schematically and in an isometric view, the door handle arrangement according to FIG. 4, but in a state in which the handle part is moved back from the actuating position into the ready position.
Figure 6:
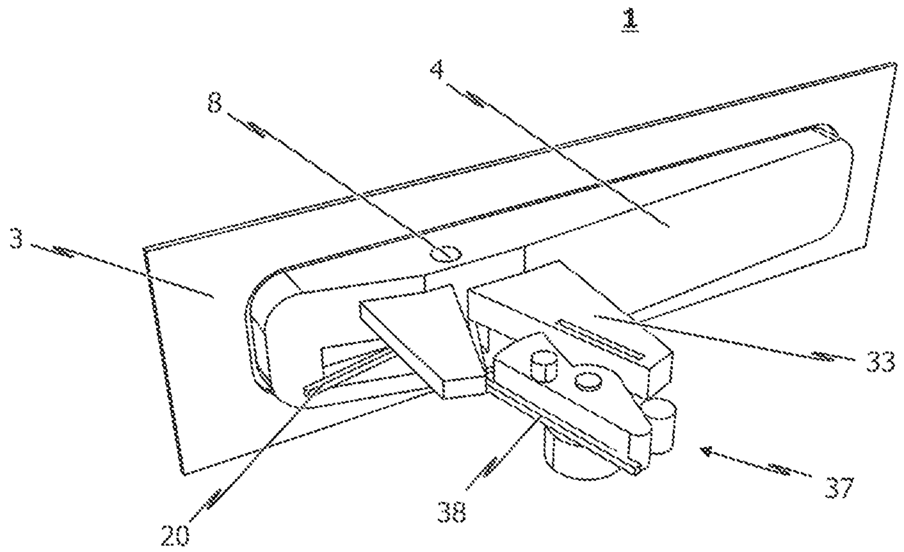
FIG. 6 schematically and in an isometric view, a door handle arrangement having a second exemplary embodiment of the actuating apparatus according to the present invention for a door lock of a vehicle door, wherein the handle part of the actuating apparatus is in a resting position.

If now, as indicated in FIG. 5, the handle part 4 is actuated back from the actuating position according to FIG. 4 into the ready position, the lever region 33 of the handle part 4 abuts the block-like contact region 35 of the lever 32 so that it is effectively prevented that the handle part 4 can be moved back into the resting position according to FIG. 2. In this way, a purely mechanical clamping protection is provided.

In FIG. 6 to FIG. 9, an alternative embodiment of a clamp protection is shown, in which a rotating damper 37 is employed.

Figure 7:
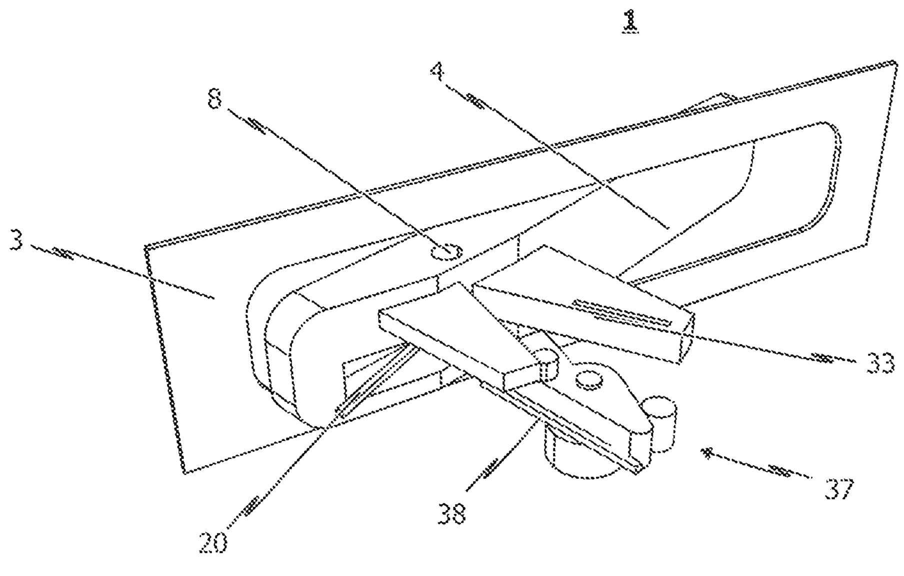
FIG. 7 schematically and in an isometric view, the door handle arrangement according to FIG. 6, wherein the handle part of the actuating apparatus is transferred/pivoted out of the resting position according to FIG. 6 into a ready position through the application of a force on the shorter lever arm of the handle part.
Figure 8:
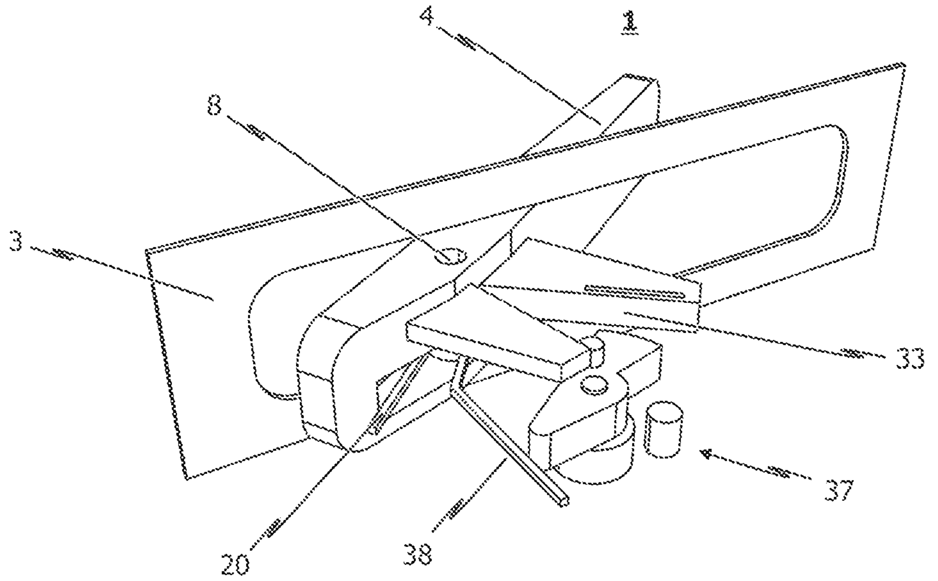
FIG. 8 schematically and in an isometric view, the door handle arrangement according to FIG. 7, but in a state in which the handle part is moved manually from the ready position according to FIG. 7 into the actuating position.
Figure 9:
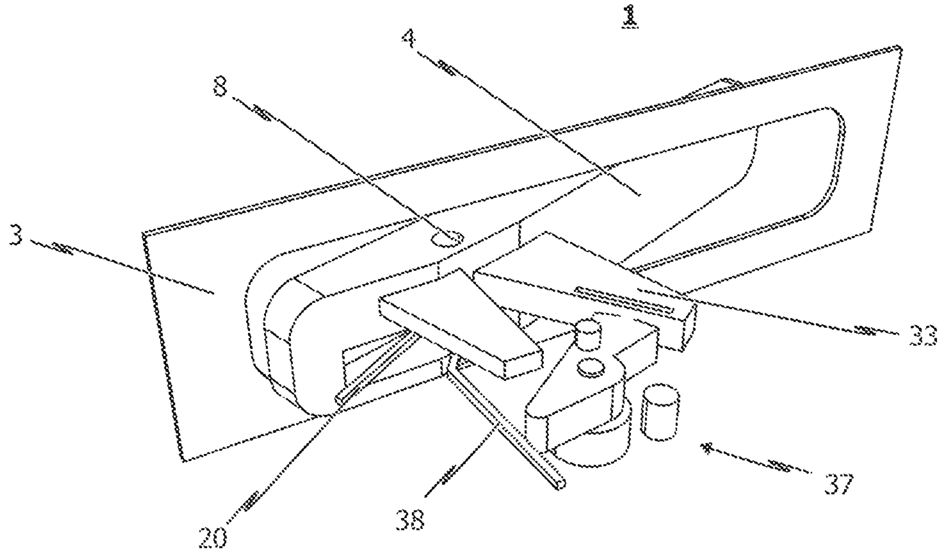
FIG. 9 schematically and in an isometric view, the door handle arrangement according to FIG. 8, but in a state in which the handle part is moved back from the actuating position into the ready position.
Figure 10:
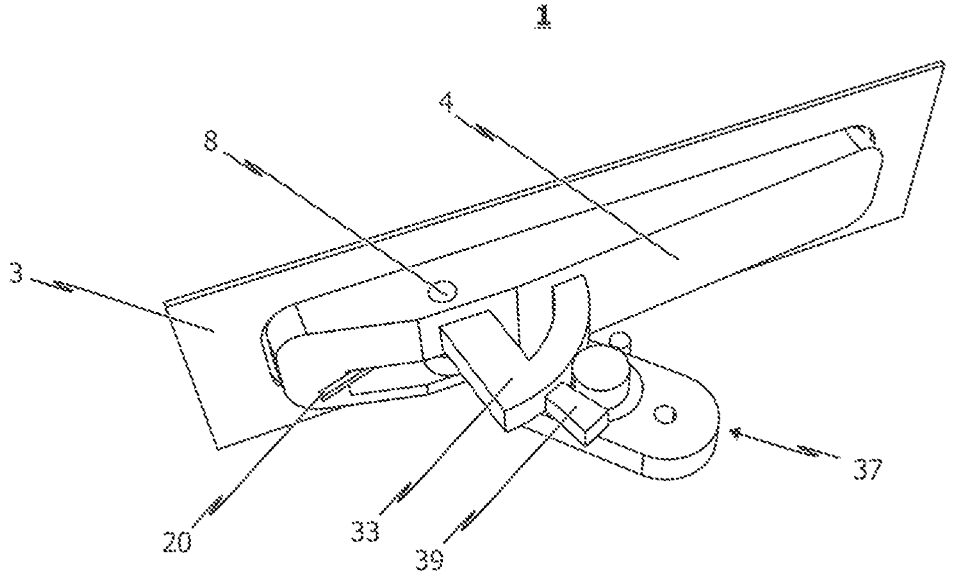
FIG. 10 schematically and in an isometric view, a door handle arrangement having a third exemplary embodiment of the actuating apparatus according to the present invention for a door lock of a vehicle door, wherein the handle part of the actuating apparatus is in a resting position.
Figure 11:
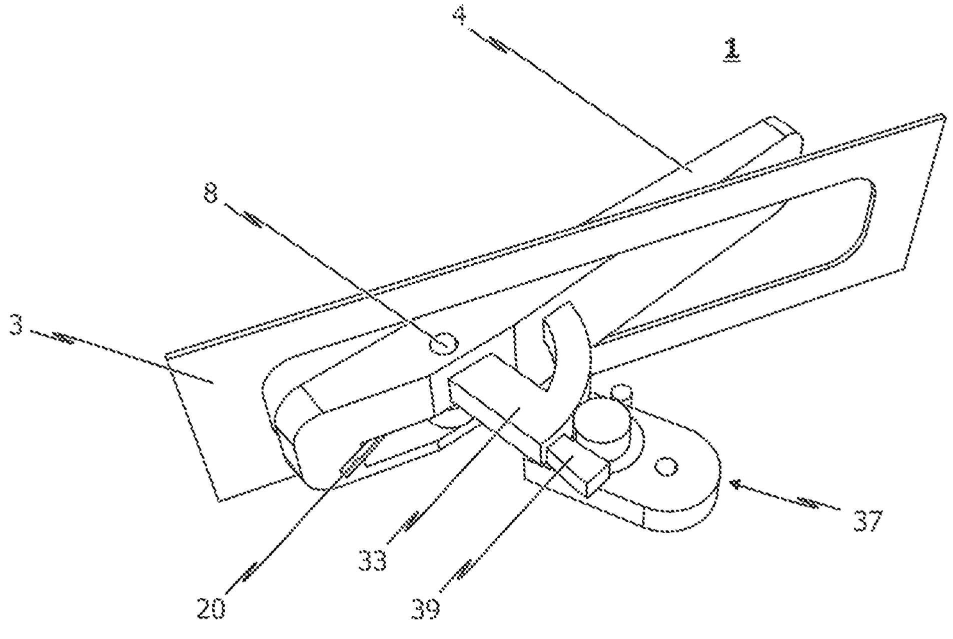
FIG. 11 schematically and in an isometric view, the door handle arrangement according to FIG. 10, wherein the handle part of the actuating apparatus is transferred/pivoted out of the resting position according to FIG. 10 into a ready position through the application of a force on the shorter lever arm of the handle part.
Figure 12:
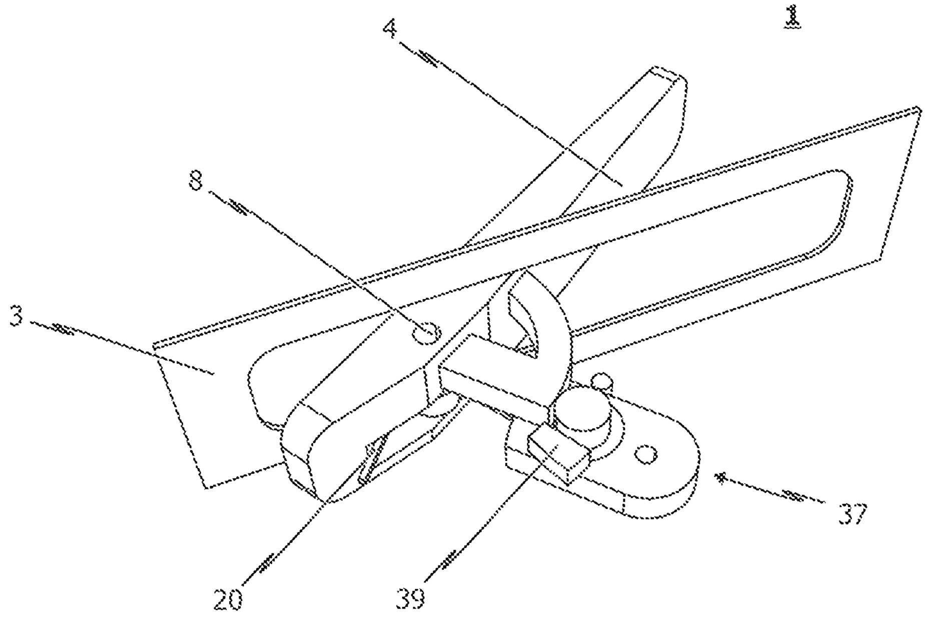
FIG. 12 schematically and in an isometric view, the door handle arrangement according to FIG. 11, but in a state in which the handle part is manually moved from the ready position according to FIG. 11 into the actuating position.

As can be seen in the illustrations in FIG. 7 and FIG. 8, the rotating damper 37 is twisted against the biasing of a spring 38 by a lever region 33 of the handle part 4. In the activated position of the rotating damper 37 according to FIG. 8, the latter blocks the handle part 4 such that it can [no longer] be transferred directly from the actuating position according to FIG. 8 into the resting position according to FIG. 6, but instead remains in an intermediate position. The rotating damper 37 then returns to its starting position in a dampened manner according to FIG. 6, so that the handle part 4 can also be moved back into the resting position with a time delay.

Figure 13:
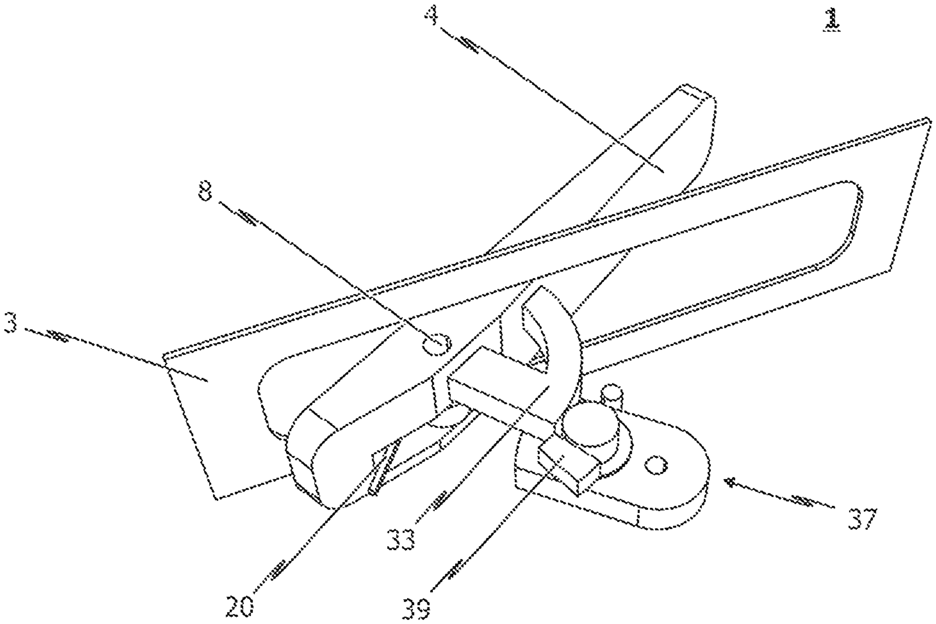
FIG. 13 schematically and in an isometric view, the door handle arrangement according to FIG. 12, but in a state in which the handle part is moved back from the actuating position into the ready position.
Figure 14:
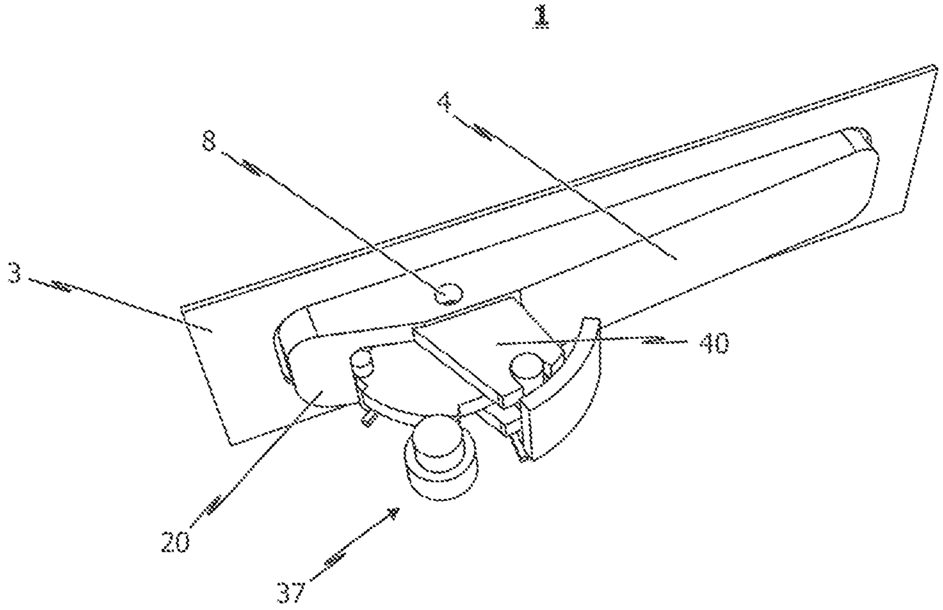
FIG. 14 schematically and in an isometric view, a door handle arrangement having a fourth exemplary embodiment of the actuating apparatus according to the present invention for a door lock of a vehicle door, wherein the handle part of the actuating apparatus is in a resting position.

A similar concept is shown in FIG. 10 to FIG. 13. Here, too, a rotating damper 37 is used, wherein a blocking element 39 is moved into the movement path of a lever region 33 of the handle part 4 when the handle part 4 is transferred from the ready position shown in FIG. 11 into the actuating position shown in FIG. 12. The blocking element 39 delays a return movement of the handle part 4 from the actuating position according to FIG. 12 into the resting position according to FIG. 10, as shown in FIG. 13.

Figure 15:
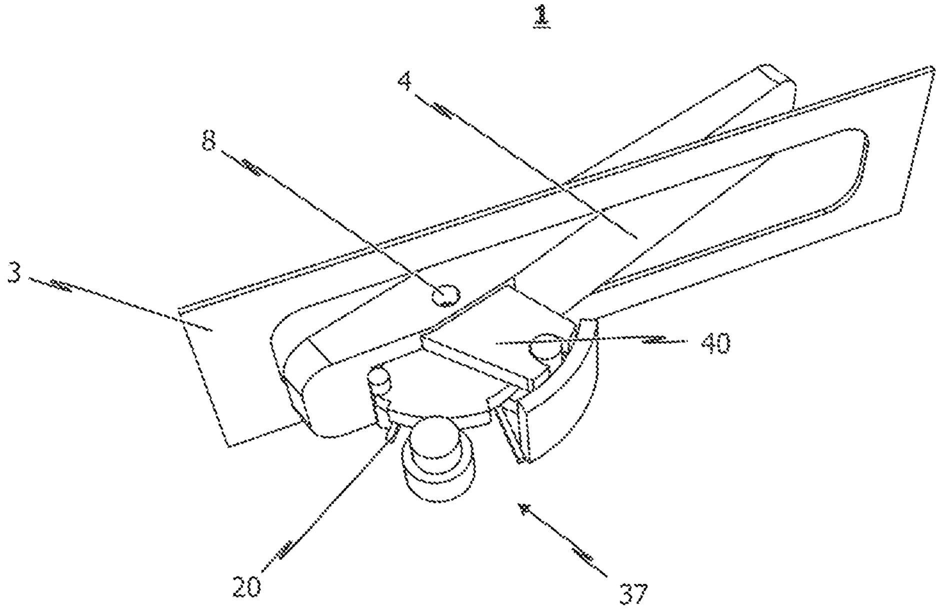
FIG. 15 schematically, and in an isometric view, the door handle arrangement according to FIG. 14, wherein the handle part of the actuating apparatus is transferred/pivoted out of the resting position according to FIG. 14 into a ready position through the application of a force on the shorter lever arm of the handle part.

A similar damping device is also used in the concept shown in FIG. 14 to FIG. 18. In detail, for this purpose, the blocking and/or delay mechanism has a control element 40, which, when the handle part 4 is transferred from the resting position shown in FIG. 14 into the ready position shown in FIG. 15, is pivoted along about the axis 8 of the handle part 4. The control element 40 is further pivoted along about the pivot axis 8 with the handle part 4 when the handle part 4 is moved into the actuating position shown in FIG. 16 proceeding from the ready position shown in FIG. 15.

Figure 16:
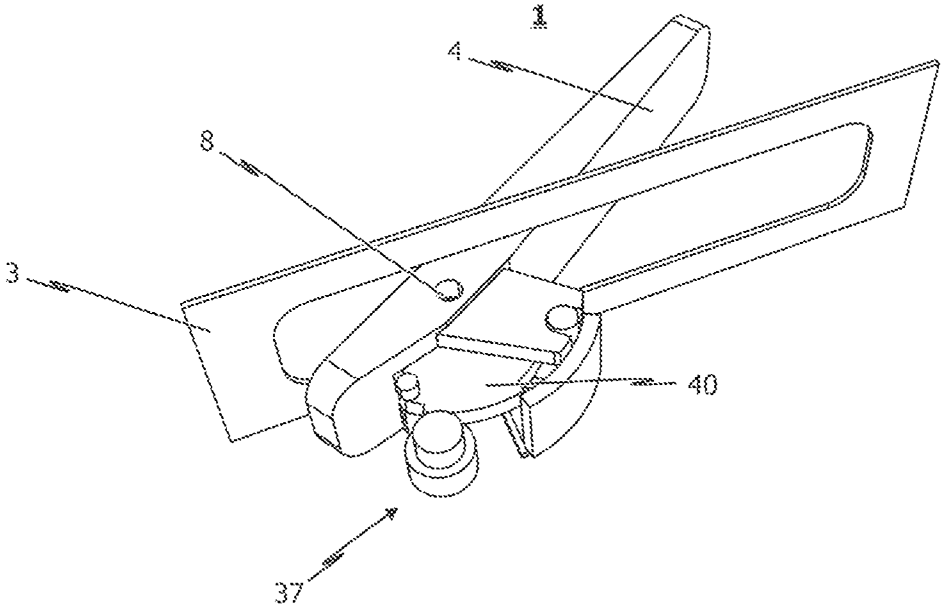
FIG. 16 schematically and in an isometric view, the door handle arrangement according to FIG. 15, but in a state in which the handle part is manually moved from the ready position according to FIG. 15 into the actuating position.
Figure 17:
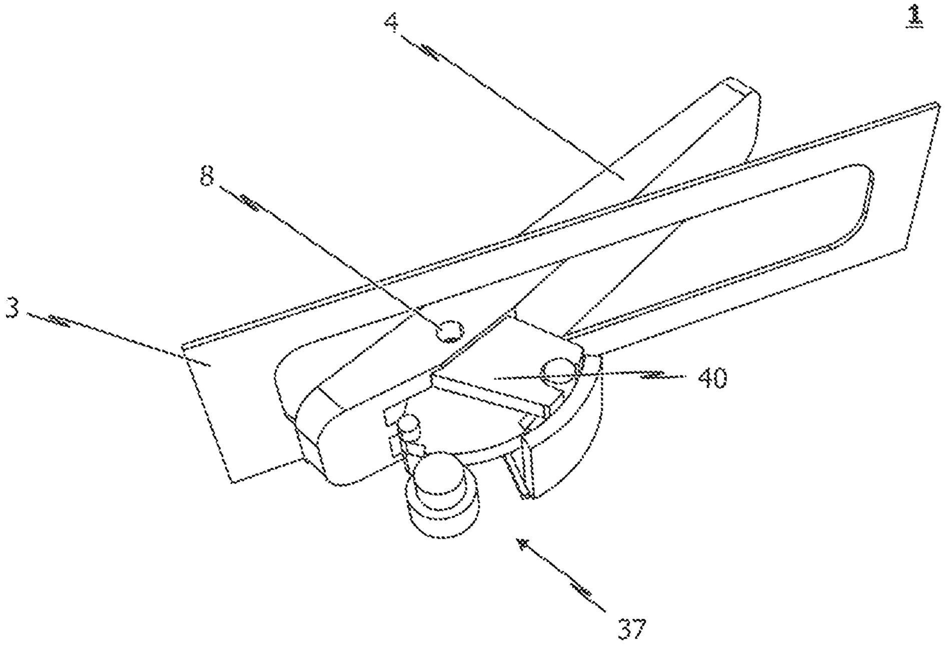
FIG. 17 schematically and in an isometric view, the door handle arrangement according to FIG. 16, but in a state in which the handle part is moved back from the actuating position into the ready position.
Figure 18:
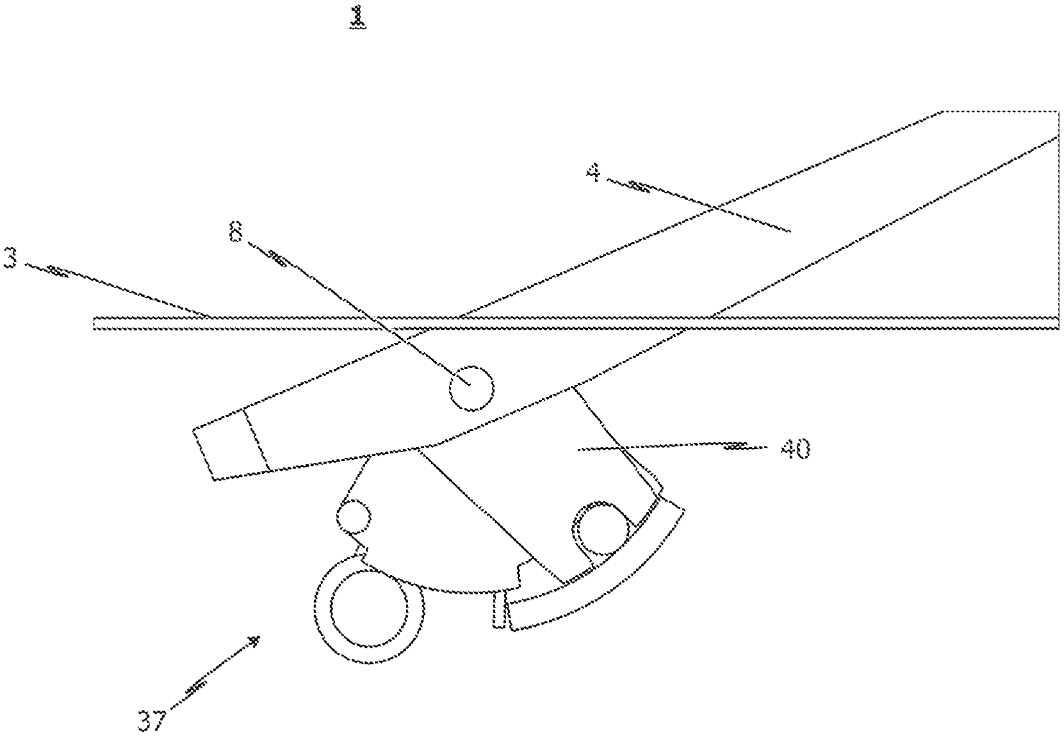
FIG. 18 schematically and in a top plan view, the door handle arrangement according to FIG. 17.
Figure 19:
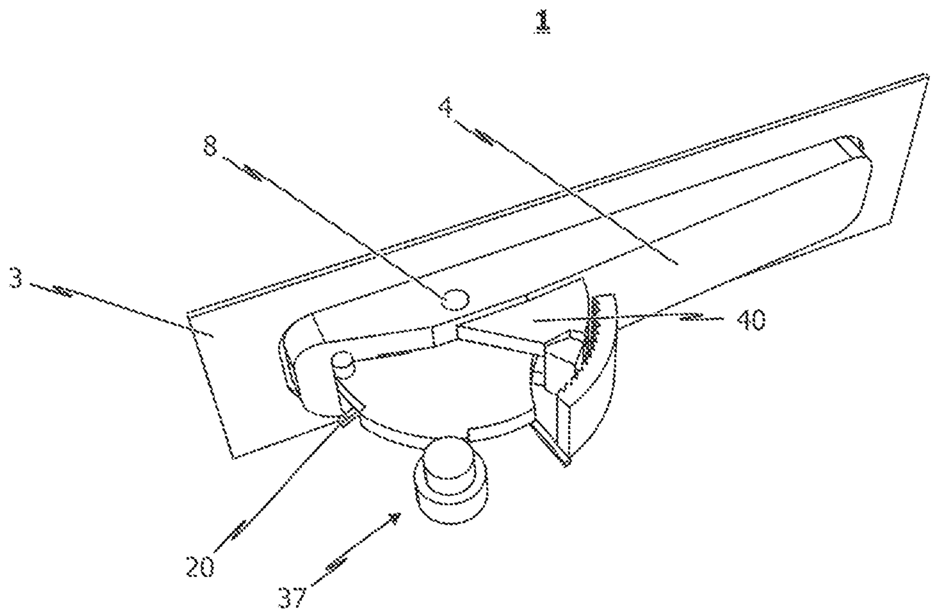
FIG. 19 schematically and in an isometric view, a door handle arrangement having a fifth exemplary embodiment of the actuating apparatus according to the present invention for a door lock of a vehicle door, wherein the handle part of the actuating apparatus is in a resting position.
Figure 20:
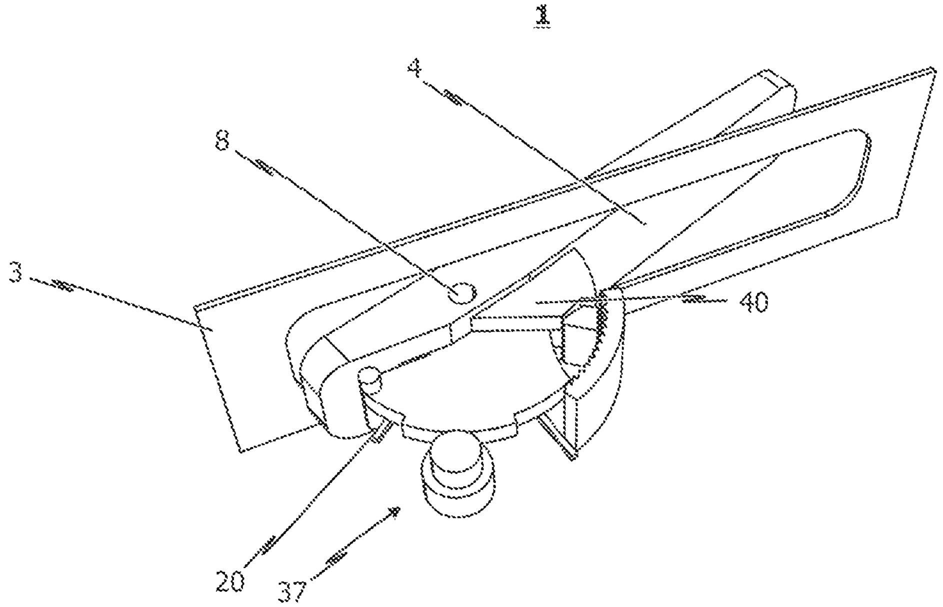
FIG. 20 schematically and in an isometric view, the door handle arrangement according to FIG. 19, wherein the handle part of the actuating apparatus is transferred/pivoted out of the resting position according to FIG. 19 into a ready position through the application of a force on the shorter lever arm of the handle part.
Figure 21:
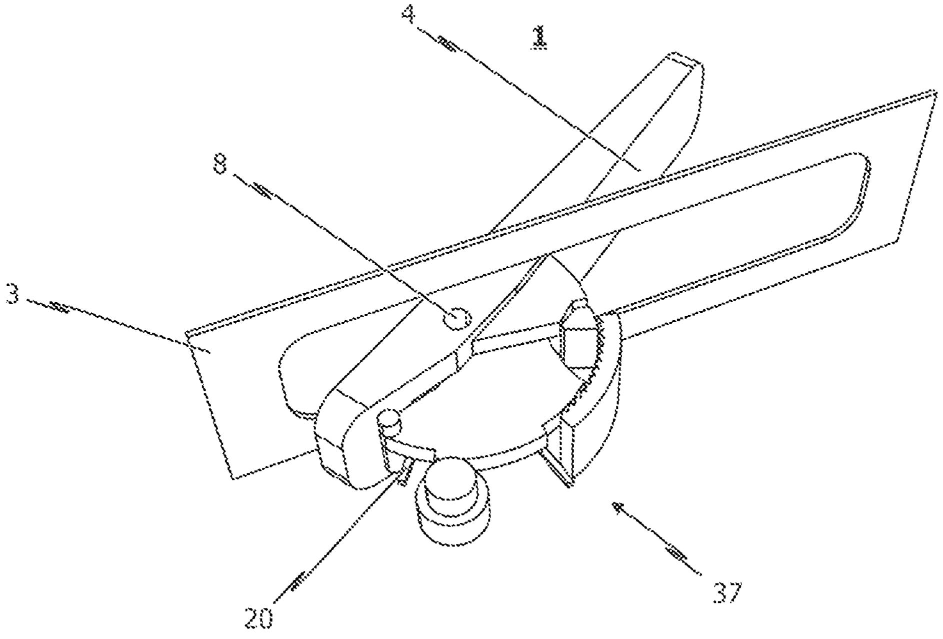
FIG. 21 schematically and in an isometric view, the door handle arrangement according to FIG. 20, but in a state in which the handle part is manually moved from the ready position according to FIG. 20 into the actuating position.
Figure 22:
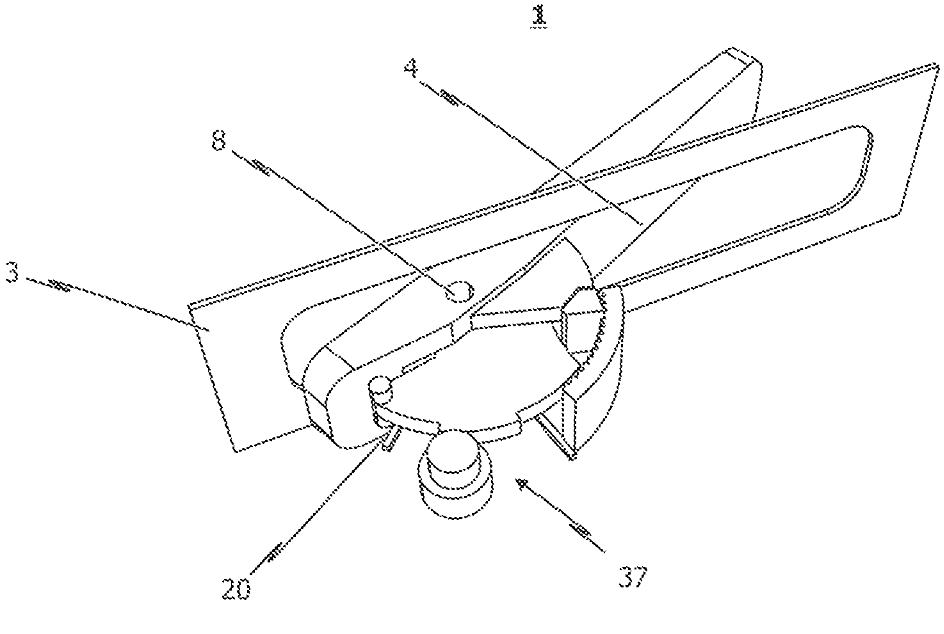
FIG. 22 schematically and in an isometric view, the door handle arrangement according to FIG. 21, but in a state in which the handle part is moved back from the actuating position into the ready position.
Figure 23:
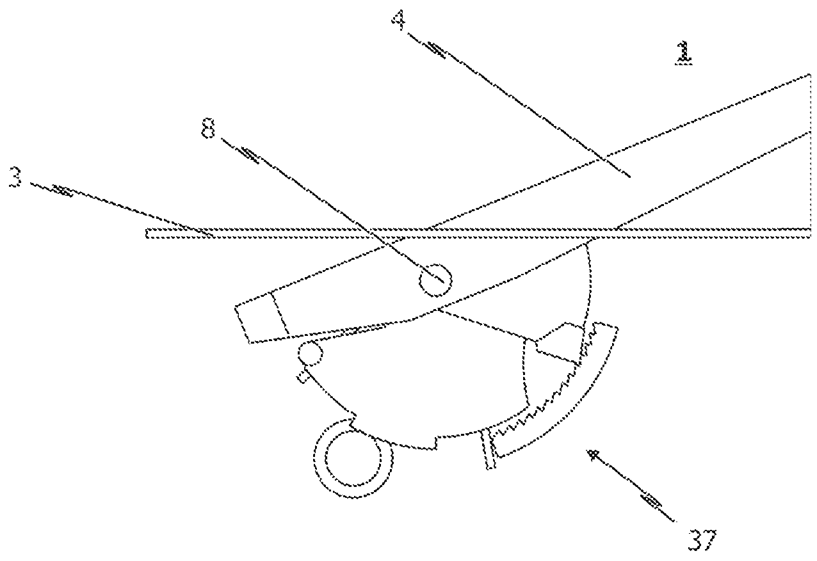
FIG. 23 schematically and in a top plan view, the door handle arrangement according to FIG. 22.
Figure 24:
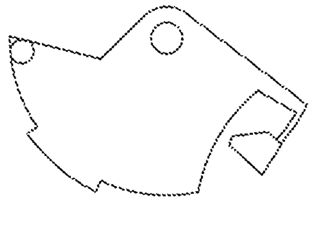
FIG. 24 schematically and in a top plan view, the control element of the blocking and/or delay mechanism of the fifth exemplary embodiment of the actuating apparatus according to the present invention.
Figure 25:
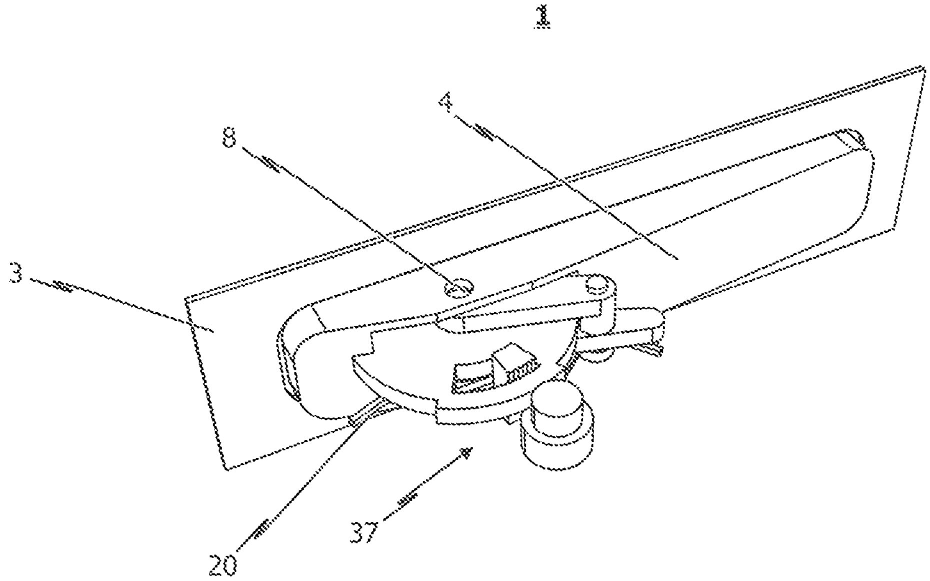
FIG. 25 schematically and in an isometric view, a door handle arrangement having a sixth exemplary embodiment of the actuating apparatus according to the present invention for a door lock of a vehicle door, wherein the handle part of the actuating apparatus is in a resting position.
Figure 26:
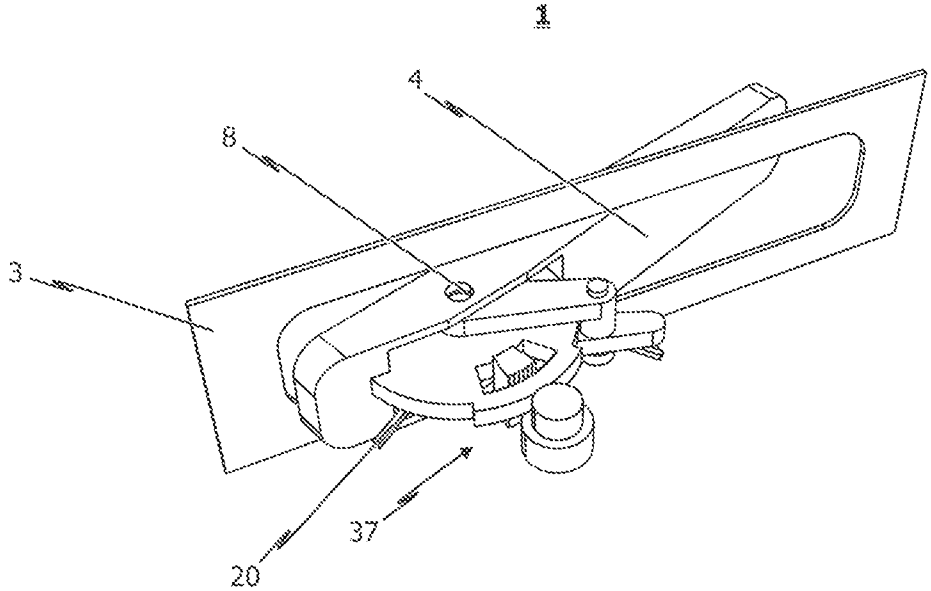
FIG. 26 schematically and in an isometric view, the door handle arrangement according to FIG. 25, wherein the handle part of the actuating apparatus is transferred/pivoted out of the resting position according to FIG. 25 into a ready position through the application of a force to the shorter lever arm of the handle part.
Figure 27:
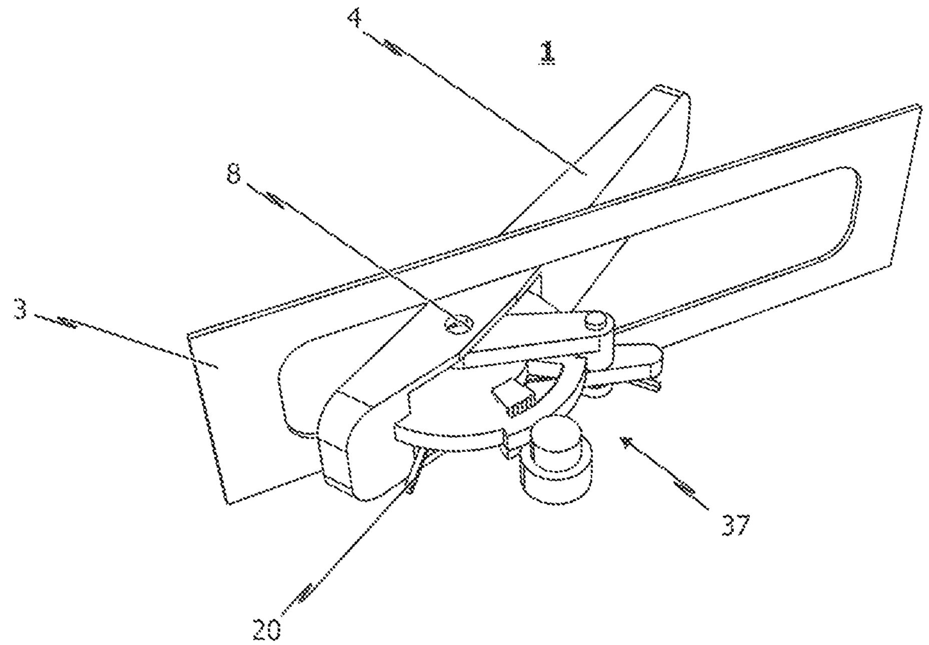
FIG. 27 schematically and in an isometric view, the door handle arrangement according to FIG. 26, but in a state in which the handle part is moved manually from the ready position according to FIG. 26 into the actuating position.
Figure 28:
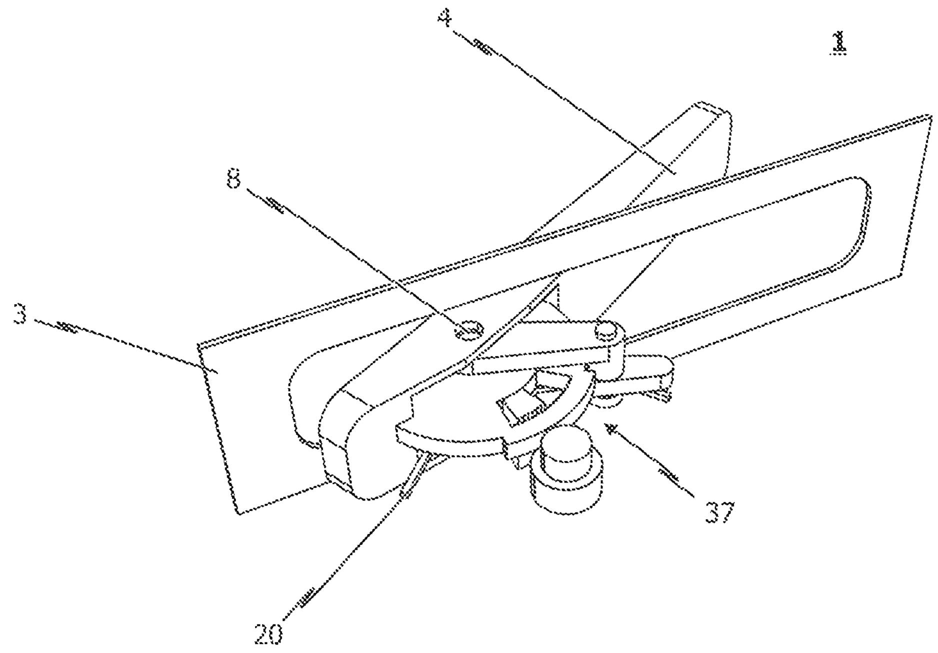
FIG. 28 schematically and in an isometric view, the door handle arrangement according to FIG. 27, but in a state in which the handle part is moved back from the actuating position into the ready position.
Figure 29:
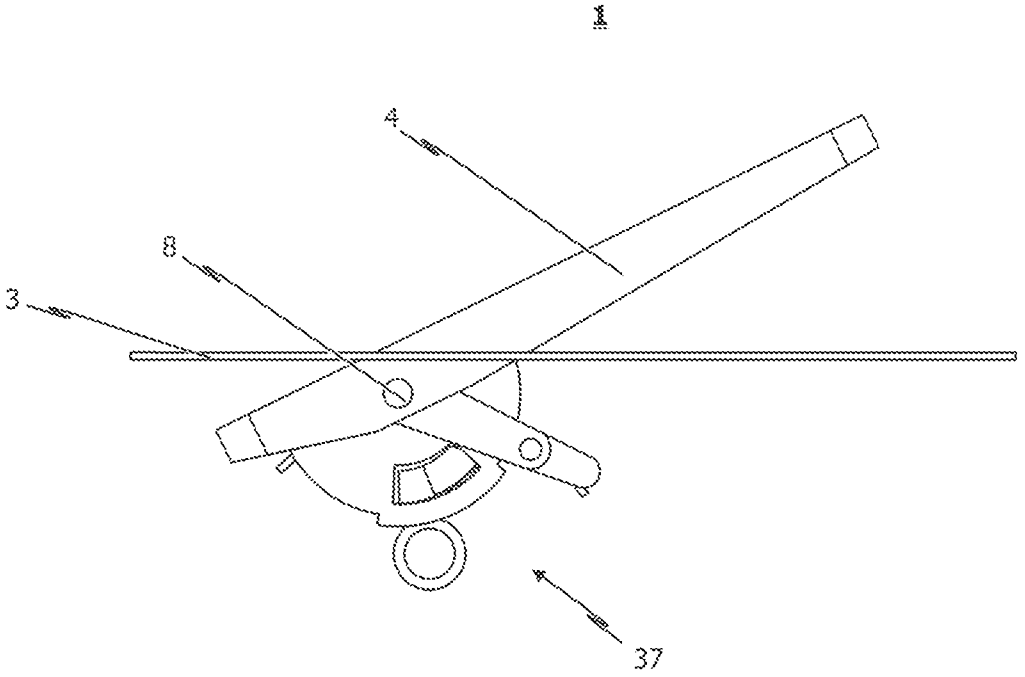
FIG. 29 schematically and in a top plan view, the door handle arrangement according to FIG. 28.
Figure 30:
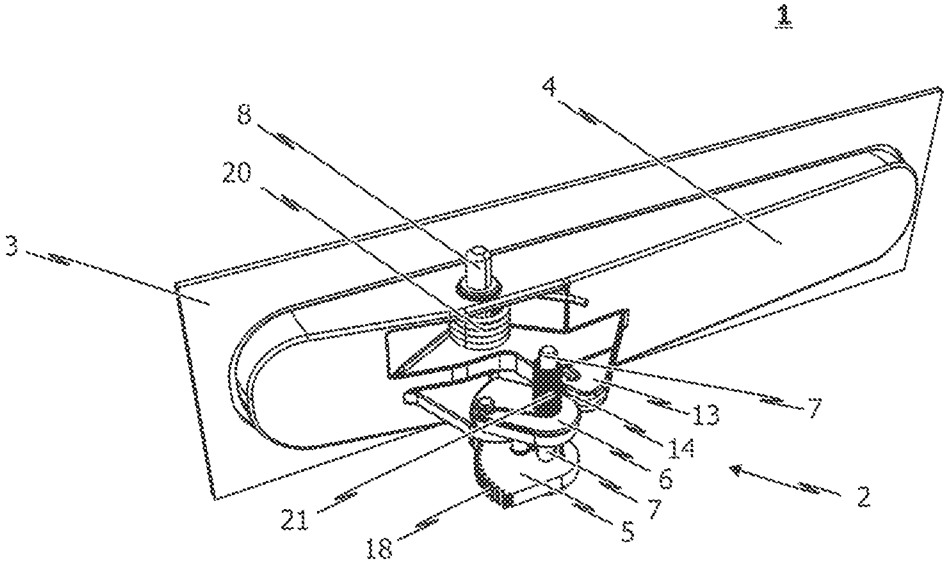
FIG. 30 schematically and in an isometric view, a door handle arrangement having a seventh exemplary embodiment of the actuating apparatus according to the present invention for a door lock of a vehicle door, wherein the handle part of the actuating apparatus is in a resting position.
Figure 31:
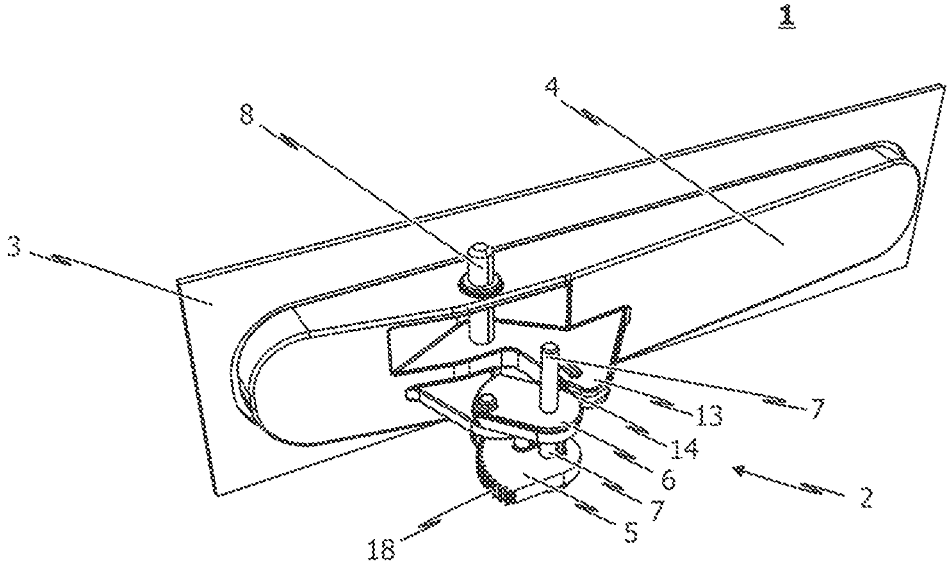
FIG. 31 schematically, and in an isometric view, the door handle arrangement according to FIG. 30, wherein however, for reasons of better illustration, components of the actuating apparatus have been omitted.
Figure 32:
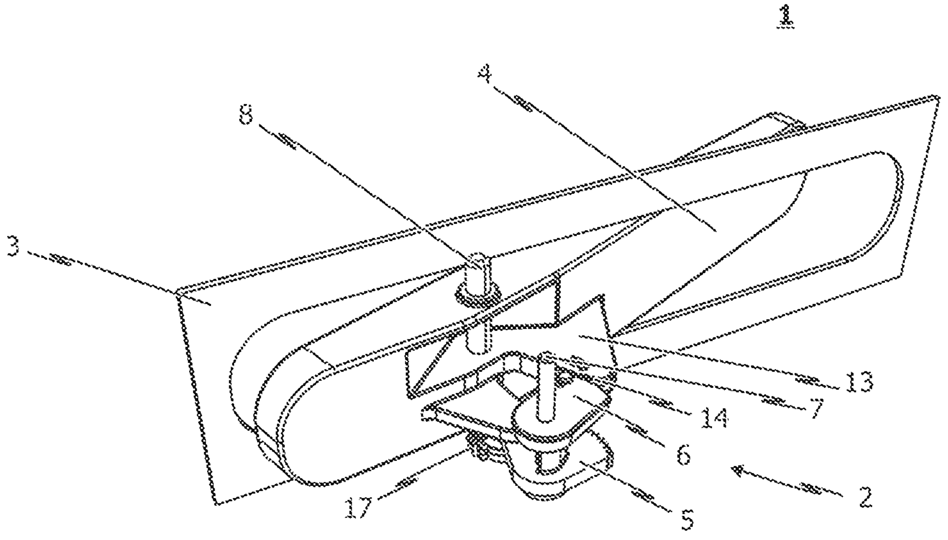
FIG. 32 schematically and in an isometric view, the door handle arrangement according to FIG. 31, wherein the handle part of the actuating apparatus is transferred/pivoted out of the resting position according to FIG. 3 into a ready position through the application of a force on the shorter lever arm of the handle part.
Figure 33:
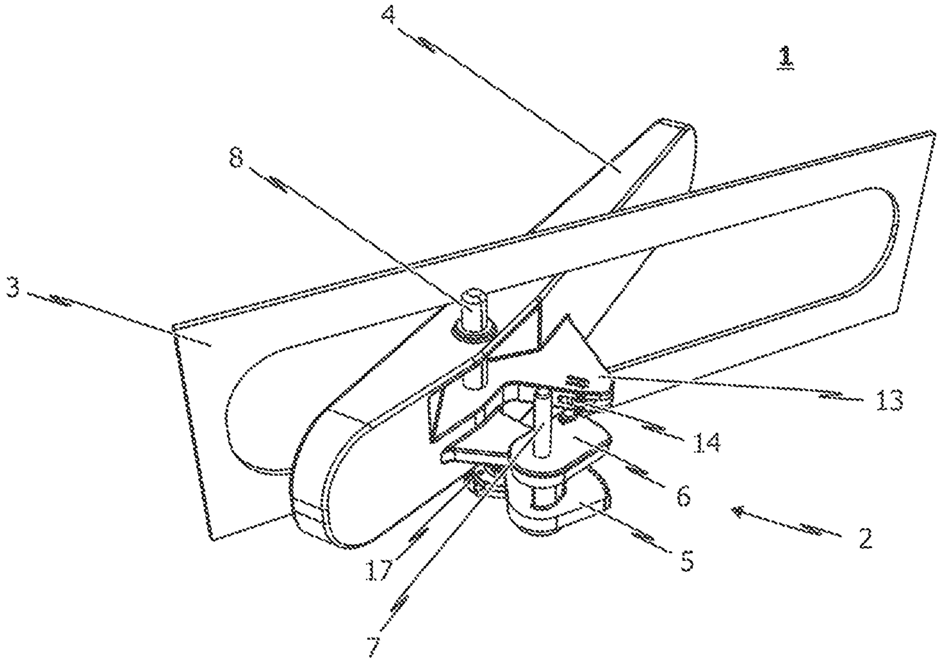
FIG. 33 schematically and in an isometric view, the door handle arrangement according to FIG. 32, but in a state in which the handle part is manually moved from the ready position according to FIG. 32 into the actuating position.
Figure 34:
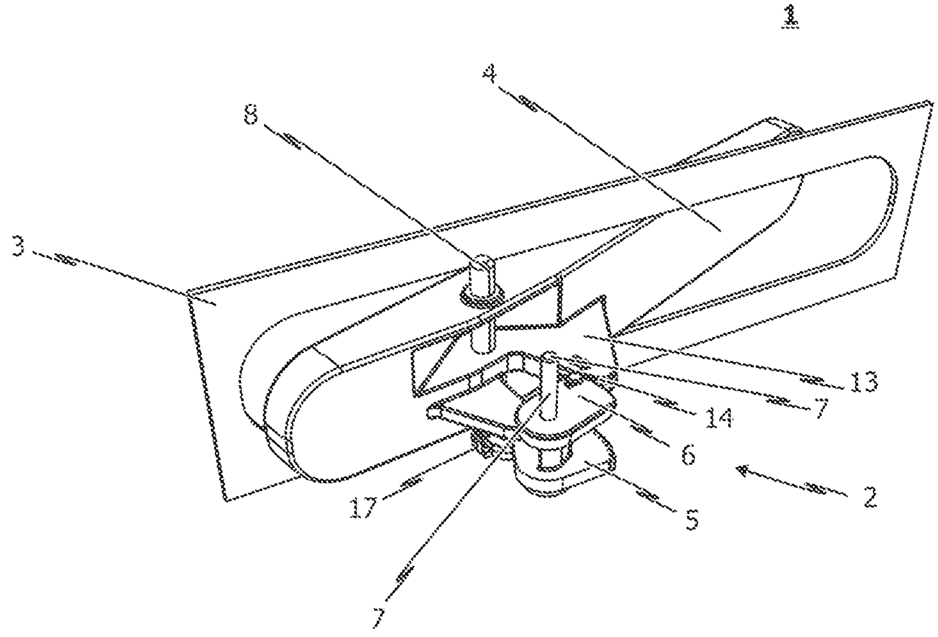
FIG. 34 schematically and in an isometric view, the door handle arrangement according to FIG. 33, but in a state in which the handle part is moved back from the actuating position into the ready position.
Figure 35:
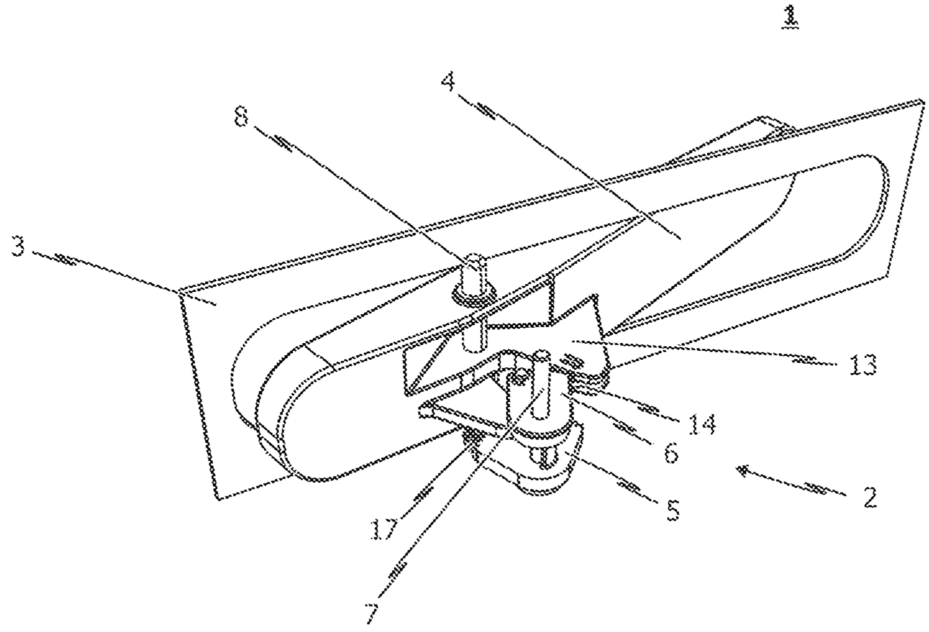
FIG. 35 schematically, and in an isometric view, the door handle arrangement according to FIG. 34, wherein however the handle part is in an intermediate position between the ready position according to FIG. 34 and the corresponding resting position.
Figure 36:
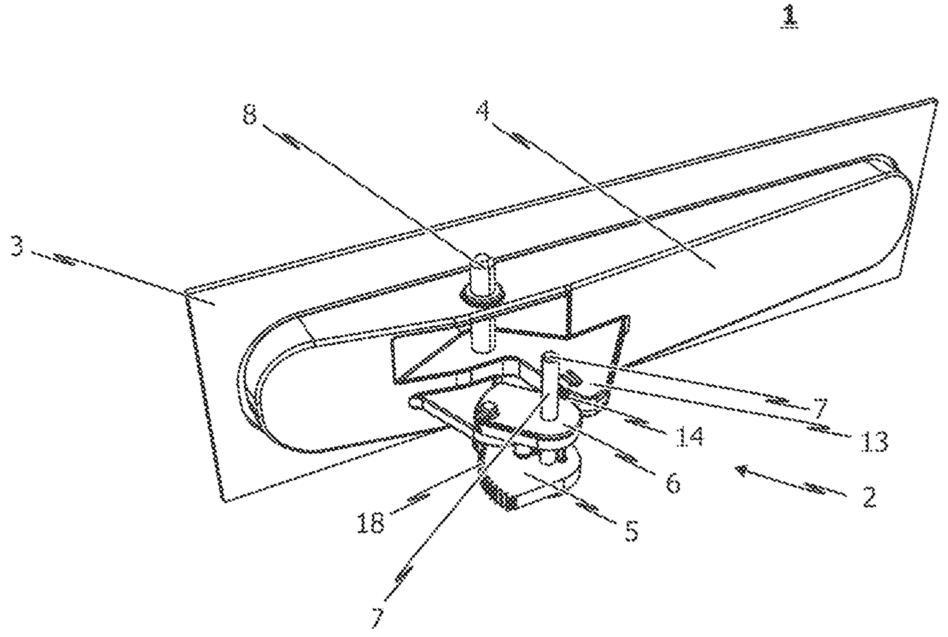
FIG. 36 schematically and in an isometric view, the door handle arrangement according to FIG. 36, wherein however the handle part is transferred back into the resting position.

However, this movement coupling between the control element 40 and the handle part 4 is interrupted when the handle part 4 is to be moved back into the resting position from the actuating position shown in FIG. 16, as can be seen in FIG. 17 and in particular in the top plan view according to FIG. 18. The control element 40 returns to the resting position in a dampened manner via the damper 37 and thus allows the handle part 4 to pivot back into the resting position with a time delay.

A similar mechanism is employed in the concept shown in FIG. 19 to FIG. 24, as well as in the concept shown in FIG. 25 to FIG. 29.

In the exemplary embodiment of the actuating apparatus 2 according the invention according to FIG. 30 to FIG. 41, it is provided that the blocking and/or delay mechanism has a control element 5 designed in particular at least in regions as a cam disk 6, which is configured in order to interact with the handle part 4 at least during the return movement of the handle part 4 from the ready position back into the resting position, such that a non-uniform sequence of movement is compelled upon the handle part 4, in particular such that the return movement is initially delayed with respect to its sequence in comparison to a subsequent sequence of movement of the handle part 4.

In the exemplary embodiment of the actuating apparatus 2 according to the invention, the control element 5 is pivotably mounted about a first pivot axis relative to the handle part 4.

In a similar manner, the handle part 4 is pivotably mounted about a second pivot axis 7, which extends in particular parallel to the pivot axis 8 of the control element 5, relative to the vehicle door 3.

A biasing element 20 in the form of a spring element is associated with the handle part 4 in order to bias the handle part 4 into the resting position of the handle part 4. As shown in the drawings, the biasing element 20 is in particular embodied as a leg spring.

A biasing element 21, in particular in the form of a spring element, is also associated with the control element 5 in order to bias the control element 5 into the starting position of the control element 5, wherein the biasing element 21 is in particular embodied as a leg spring.

The control element 5 is coupled or operatively connected to the handle part 4 via a gear element or via a gear mechanism such that, during a pivoting movement of the handle part 4 about the second pivot axis 8 caused in order to transfer the handle part 4 from the resting position into the ready position, the control element 5 is transferred from the aforementioned starting position into a ready position by way of a pivoting of the control element 5 about the first pivot axis 7.

The gear element or the gear mechanism, via which the control 5 element is coupled or operatively connected to the handle part 4, is further configured in order to, upon or after reaching the ready position of the control element 5, suspend or at least interrupt the coupling or operative connection between the control element 5 and the handle part 4 such that, during a pivoting movement of the handle part 4 about the second pivot axis 8 caused in order to transfer the handle part 4 from the ready position into the actuating position, the control element 5 is not further or no longer pivoted about the first pivot axis 7.

In particular, the gear element or the gear mechanism is configured in order to hold the control element 5 in the ready position when the handle part 4 is further pivoted from the ready position into the actuating position and vice versa upon or after reaching the ready position of the control element 5.

Figure 37:
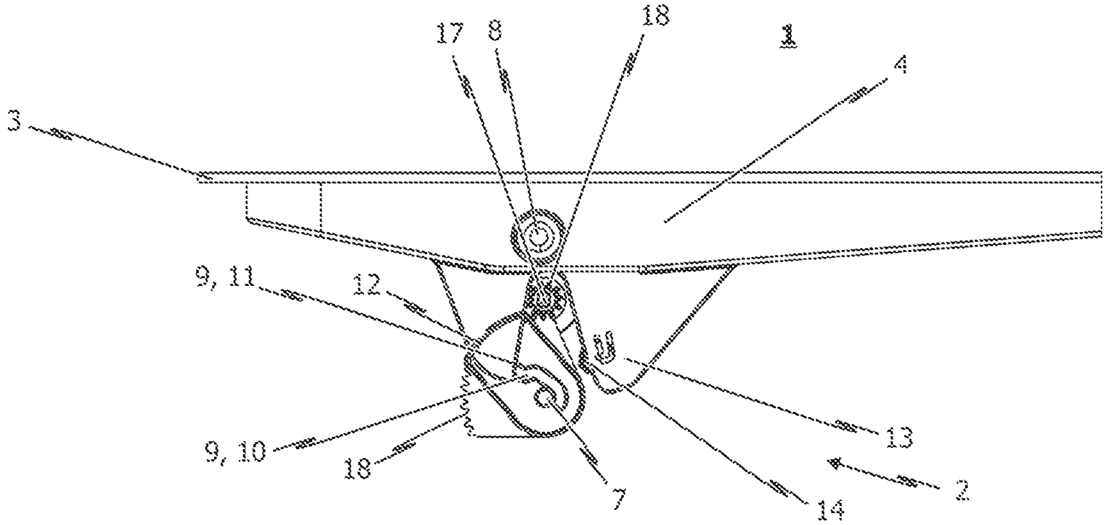
FIG. 37 schematically, and in a partially cut/partially transparent top plan view, the door handle arrangement according to FIG. 1, wherein the handle part is in the resting position.
Figure 38:
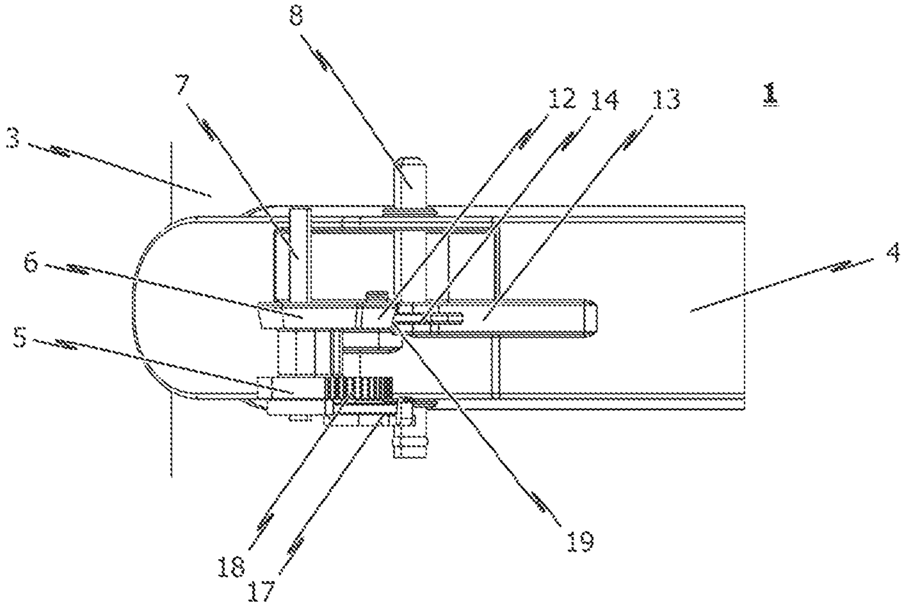
FIG. 38 schematically, the overload protection of the actuating apparatus according to FIG. 31, wherein the door handle arrangement is in a state in which the handle part is transferred from the actuating position into the ready position, wherein the overload protection is in the unactivated state.
Figure 39:
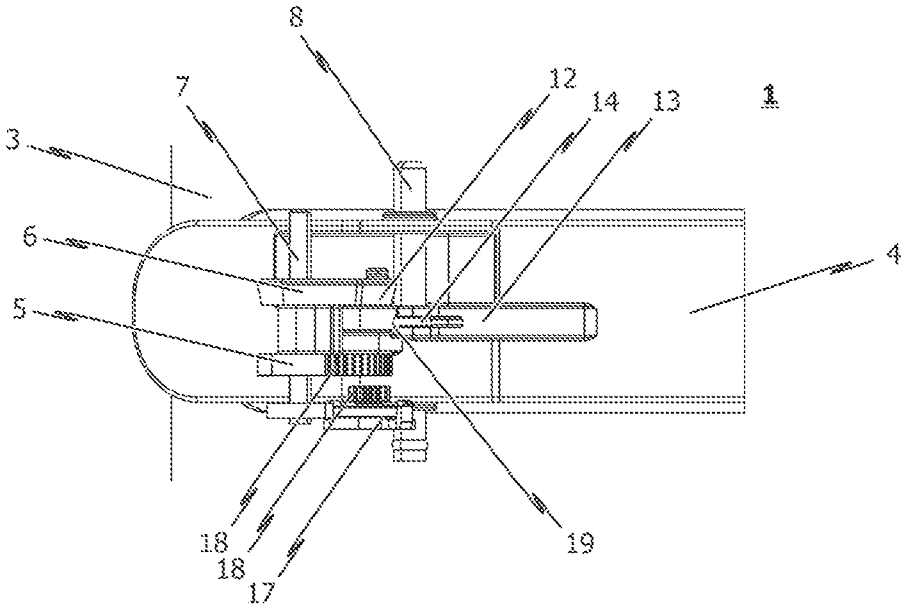
FIG. 39 schematically, the overload protection of the actuating apparatus according to FIG. 31, wherein the door handle arrangement is in a state in which the handle part is transferred from the actuating position into the ready position, wherein, for this purpose, a force exceeding a critical value (clamping force) is applied to the longer lever arm of the handle part, as a result of which the overload protection of the actuating apparatus engages in order to separate the handle part from the blocking and/or delay mechanism.
Figure 40:
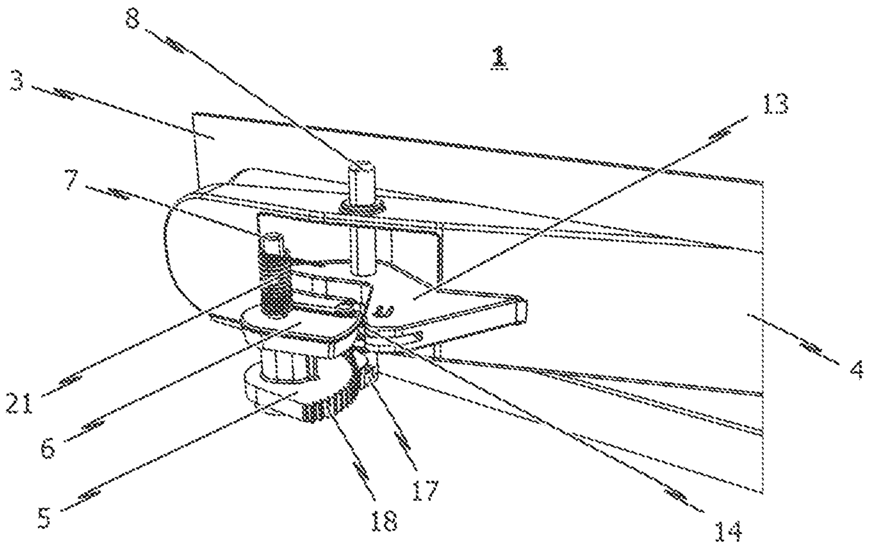
FIG. 40 schematically and in an isometric view, the components of the overload protection according to FIG. 38 in an unactivated state.
Figure 41:
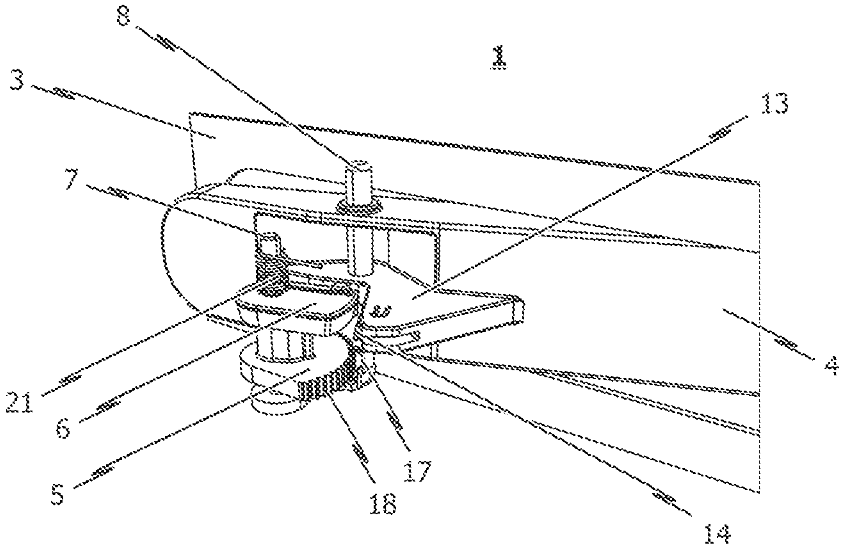
FIG. 41 schematically and in an isometric view, the components of the overload protection according to FIG. 39 after they have been triggered.

As can in particular be seen in the illustration in FIG. 37, the gear element 9 has a slotted control system for this purpose, or is at least partially configured as a slotted control system. The slotted control system has a slotted guide 10, in particular in the form of a slotted guide surface, which is configured in order to forcibly guide a slotted region 11 of the handle part 4 associated with the slotted control system and operatively connected to the handle part 4 according to the slotted guide 10.

As already indicated, the blocking and/or delay mechanism has a control element 5, which is embodied as a cam disk 6 at least in regions, in order to compel a non-uniform sequence of movement on the handle part 4.

In particular, the control element 5 is configured at least in regions as a cam disk 6 having a non-uniform edge region 12.

On the other hand, the handle part 4 has a lever region 13 fixedly connected to the handle part 4. The lever region 13 is configured in order to pick up the movement the non-uniform edge region 12 of the cam disk 6 resulting from the rotation of the cam disk 6 about the first pivot axis 7 during the movement of the control element 5 from the ready position into the starting position, such that the sequence of movement of the handle part 4 is controlled by the control element 5 accordingly during the movement of the control element 5 from the ready position into the starting position.

In detail, the blocking and/or delay mechanism is configured such that a contact between the lever region 13 of the handle part 4 and the non-uniform edge region 12 of the cam disk 6 is suspended upon or after reaching the ready position of the control element 5, in particular during a further movement of the handle part 4 from the ready position into the actuating position.

In the cam disk mechanism thus formed, the lever region 13 of the handle part 4 has a guide roller or a guide wheel 14, via which a movement of the non-uniform edge region 12 of the cam disk 6 is picked up during the movement of the control element 5 from the starting position into the ready position and back.

The guide roller or the guide wheel 14 is preferably elastically, in particular spring-elastically, mounted at least in regions in the lever region 13 of the handle part 4, such that, when a in particular predetermined or determinable critical force is applied to the guide roller or the guide wheel 14 via the edge region 12 of the cam disk 6, the roller or wheel can be pressed into the lever region 13 in order to protect the guide roller or the guide wheel 14 from an overload,.

In an alternative embodiment, not shown in the drawings, the guide roller or the guide wheel 14 is also mounted at least in regions in the lever region 13. However, the mounting is not designed elastically.

Rather, in the alternative embodiment, it is provided that the guide roller or the guide wheel 14 has an axis as well as an outer roller surface arranged coaxially and/or concentrically to the axis, said roller surface being connected to the axis elastically, in particular spring-elastically, such that, when a in particular predetermined or determinable critical force is applied to the guide roller or the guide wheel 14 via the edge region 12 of the cam disk 6, the outer roller surface of the guide roller or guide wheel 14 can be pressed into the lever region 13 at least in regions.

In principle, such a guide roller or a guide wheel 14 for picking up a movement of the non-uniform edge region 12 of the cam disk 6 can be considered an optional feature. The movement of the non-uniform edge region 12 of the cam disk 6 can also be picked up via a direct line contact.

The blocking and/or delay mechanism has a braking device 17 associated with the control element 5, which device is configured in order to brake a pivoting movement of the control element 5 during the pivoting about the first pivot axis 7.

The braking device 17 has in particular a rotating damper, which preferably is or can be brought into operative connection with the control element 5 via a gear, in particular a cogwheel 18, such that at least a pivoting movement of the control element 5 from the ready position into the starting position is braked. In principle, however, it is also conceivable here that the rotating damper is configured in order to brake rotationally on both sides.

As shown in FIG. 38 to FIG. 41, the blocking and/or delay apparatus 2 or the blocking and/or delay mechanism of the actuating apparatus 2 can have an overload protection associated with the control element 5, which protection is configured in order to suspend the contact between the lever region 13 of the handle part 4 and the control element 5, and in particular the contact between the lever region 13 and the non-uniform edge region 12 of the region of the control element 5 configured as a cam disk 6, during a return movement of the handle part 4 from the ready position back into the resting position, when a in particular predetermined or determinable critical force is applied during the transfer of the handle 4 part into the resting position.

For as-needed suspension of the contact between the lever region 13 and the control element 5, the control element 5 is in particular configured slidably relative to the lever region 13 along the first pivot axis 7.

In this context, it is in particular provided that the spring element 21 associated with the control element 5 is configured as a leg spring, which is designed to be compressible in its longitudinal direction, so that with this spring 21 the control element 5 is biased in the lower position, i.e. in the position in which the overload protection is not active.

On the other hand, the non-uniform edge region 12 of the cam disk 6 and an edge region 19 of the lever region 13 provided with the edge region 12 of the cam disk 6 for picking up a movement of the cam disk 6 are configured to run diagonally such that, upon exceeding critical force that is exerted by the lever region 13 on the edge region 12 of the cam disk 6 and is in particular predetermined or determinable, the overload protection is activated and the control element 5 is slid along the first pivot axis 7 relative to the lever region 13.

After activating the overload protection, the handle part 4 can return into the resting position, while the control element 5 also moves back into its resting position with a time delay and is then deactivated again due to the spring associated with the control element 5.

Figure 42:
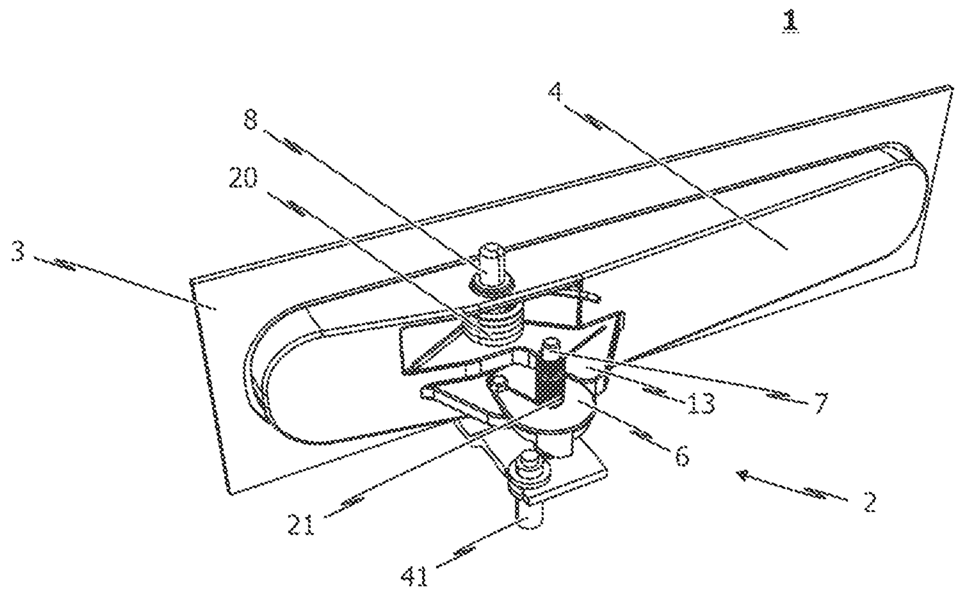
FIG. 42 schematically and in an isometric view, a door handle arrangement having an eighth exemplary embodiment of the actuating apparatus according to the present invention for a door lock of a vehicle door, wherein the handle part of the actuating apparatus is in a resting position.

FIG. 42 shows a further embodiment of the actuating apparatus according to the invention for a door lock, wherein the handle part of the actuating apparatus is present in a resting position.

The concept shown in FIG. 42 is characterized in that a manipulator 41 is associated with the door device, which manipulator can be moved between a released position in which the door lock is unlocked and a neutral position in which the door lock is locked.

With respect to the blocking and/or delay mechanism, it is provided in the actuating apparatus shown in FIG. 42 that the former has a control element designed in particular at least in regions as a cam disk, which is configured in order to interact with the handle part at least during the return movement of the handle part from the ready position back into the resting position in such a way that a non-uniform sequence of movement is compelled upon the handle part, namely such that, initially during a return movement of the handle part, in particular in a predetermined or determinable period of time, the sequence of movement of the handle part is delayed in comparison to a subsequent sequence of movement of the handle part.

On the other hand, the manipulator 41 associated with the door lock is configured in order to interact with the control element in its released position, wherein the interaction with the control element is suspended in the neutral position of the manipulator.

As in the embodiment shown in FIG. 30 to FIG. 41, it is provided in the actuating apparatus according to FIG. 42 that the control element is pivotably mounted about a first pivot axis relative to the handle part, wherein the handle part is pivotably mounted about a second pivot axis extending in particular parallel to the pivot axis of the control element relative to the vehicle door, wherein the control element is coupled or operatively connected to the handle part via a gear element or a gear mechanism such that, during a pivoting movement of the handle part about the second pivot axis caused in order to transfer the handle part from the resting position into the ready position, the control element is transferred from a starting position into a ready position by way of a pivoting of the control element about the first pivot axis.

Here, the manipulator 41 associated with the door lock is configured such that it permits, in its released position, the transfer of the control element from the starting position into the ready position but blocks a pivoting or rotating movement of the control element about the first pivot axis that is necessary for the transfer of the control element from the ready position back into the starting position, In this context, it is conceivable that the manipulator 41 associated with the door lock is configured such that, in its released position, it forms a pawl with the control element, such that a pivoting or rotating movement of the control element about the first pivot axis, which is necessary for the transfer of the control element from the starting position into the ready position, is made possible, but a pivoting or rotating movement of the control element about the first pivot axis, which is necessary for the transfer of the control element from the ready position back into the starting position, is blocked.

According to implementations of this aspect, it is provided that the manipulator 41 associated with the door lock is configured in such a way that, in its released position, it forms a mold pawl with the control element, in particular a tooth pawl or bar pawl and/or a friction pawl.

Alternatively or additionally, it is conceivable that the manipulator 41 associated with the door lock is in particular configured as a blocking element, and wherein the control element has a blocking projection with a stop, wherein, in the released position, the manipulator 41 configured as a blocking element abuts against the stop and blocks a pivoting or rotating movement of the control element about the first pivot axis, which is necessary for the transfer of the control element from the ready position back into the starting position.

According to implementations of this aspect, it is provided that the blocking projection of the control element has a first, in particular flat, flank region and an opposing second, in particular steep, flank region, wherein the second, in particular steep, flank region defines the stop, and wherein the control element and/or the manipulator 41 configured as a blocking element are configured such that, when the control element is transferred from the starting position into the ready position, the manipulator 41 configured as a blocking element slides over the first, in particular flat, flank region of the blocking projection of the control element, while the manipulator 41 configured as a blocking element, when attempting to rotate backwards, hits against a second, in particular steep, flank region, forms a positive lock with the latter, and blocks the pivoting or rotating movement of the control element about the first pivot axis, which necessary for the transfer of the control element from the ready position back into the starting position.

In this context, for example, it is conceivable that the control element and/or the manipulator 41 configured as the blocking element are configured such that when the control element is transferred from the starting position into the ready position, the control element is movable along the first pivot axis relative to the manipulator 41 configured as the blocking element.

According to implementations of the actuating apparatus according to the invention, it is provided that the manipulator 41 associated with the door lock is configured as a blocking element that can be retracted and extended parallel to the first pivot axis relative to the control element, wherein the blocking element is in its retracted state in the neutral position of the manipulator and in its extended state in the released position of the manipulator.

The invention further relates to a door handle arrangement for a vehicle door, wherein the door handle arrangement has an actuating apparatus of the manner according to the invention described above.

In addition, the present invention relates to a vehicle door having a door handle arrangement or actuating apparatus for actuating a door lock of the vehicle door as needed.

In the resting position of the handle part, the handle part is arranged at least substantially flush with a surface of the vehicle door when the actuating apparatus is installed in the vehicle door. In the ready position, when the actuating apparatus is installed in the vehicle door, the handle part projects at least in regions from the vehicle door further than in the resting position.

Figure 43:
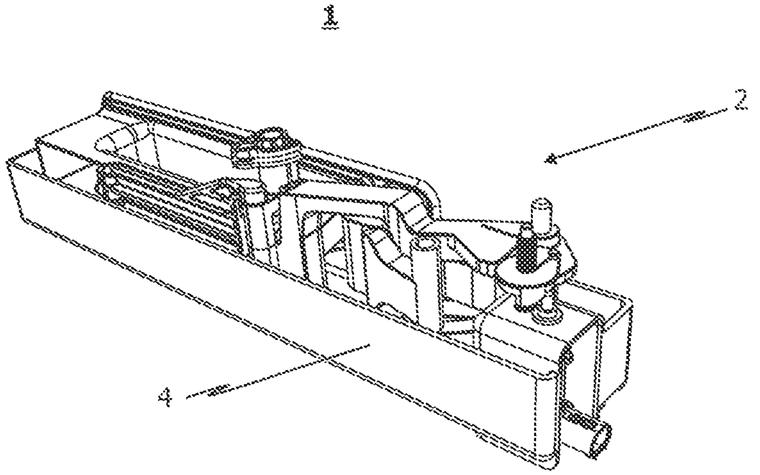
FIG. 43 schematically and in an isometric view, a door handle arrangement having a ninth exemplary embodiment of the actuating apparatus according to the present invention for a door lock of a vehicle door, wherein the handle part of the actuating apparatus is in a resting position.
Figure 44:
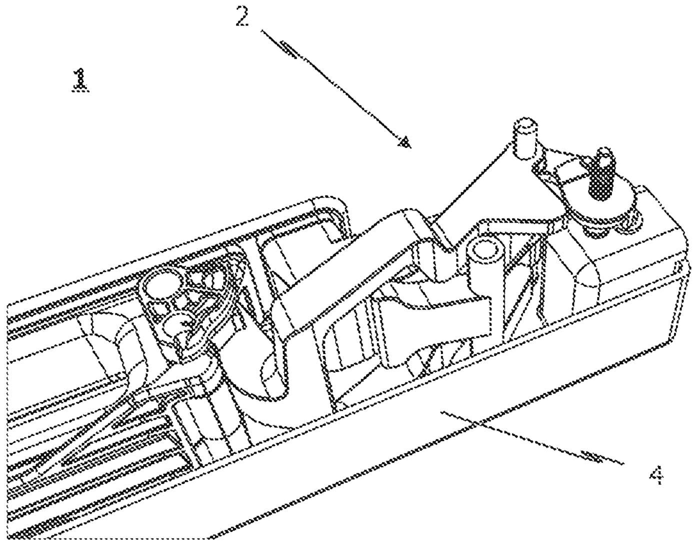
FIG. 44 details of the door handle arrangement according to FIG. 43.

In the embodiment shown in FIG. 43 and FIG. 44, the handle part is present in both the ready position as well as the actuating position at least substantially parallel to the outer shell of the vehicle, and in particular exactly parallel to the outer shell of the vehicle, wherein the handle part is associated with a kinematics for this purpose, which is configured in order to translate a rotating movement generated by an actuator, in particular an electro-motor actuator, into a linear movement of the handle part. Here, the kinematics is associated with a blocking and/or delay mechanism, as it is also used in the actuating apparatus according to FIG. 42.

The invention is not limited to the embodiments shown in the drawings, but results when all of the features disclosed herein are considered together.

LIST OF REFERENCE NUMERALS

1 Door handle arrangement
2 Actuating apparatus
3 Vehicle door
4 Handle part
5 Control element
6 Cam disk of the control element
7 First pivot axis
8 Second pivot axis
9 Gear mechanism
10 Slotted guide
11 Slotted region of the handle part
12 Non-uniform edge region of the cam disk
13 Lever region
14 Guide roller/guide wheel
15 Axis of the guide roller/guide wheel
16 Roller surface of guide roller/guide wheel
17 Braking device
18 Gear/cogwheel
19 Edge region of the lever region
20 Biasing element of the handle part
21 Biasing element of the control element
31 Pivot axis
32 Rocker-like mounted lever
33 Lever region
34 Weight
35 Block-like contact region
36 Damper
37 Rotating damper
38 Spring
39 Blocking element
40 Control element
41 Manipulator

The invention claimed is:

1. An actuating apparatus for a door lock of a vehicle door, wherein the actuating apparatus has a handle part that is grippable by a hand, wherein the handle part is configured in order to be transferable between a resting position and a ready position, and wherein the handle part is manually movable into an actuating position proceeding from the ready position and is pivotably or linearly extendable, wherein the actuating apparatus is configured in order to actuate the door lock when the handle part reaches or has reached the actuating position, wherein the actuating apparatus has a blocking and/or delay mechanism, which cooperates with the handle part such that, during a return movement, the handle part is transferable from the ready position back into the resting position only with a time delay and/or only in an at least partially braked or dampened manner;

wherein the blocking and/or delay mechanism has a control element;

wherein the control element is pivotably mounted about a first pivot axis relative to the handle part, wherein the handle part is pivotably mounted relative to the vehicle door about a second pivot axis extending parallel to the first pivot axis, wherein the control element is coupled or operatively connected to the handle part via a gear element or a gear mechanism such that, during a pivoting movement of the handle part about the second pivot axis in order to transfer the handle part from the resting position into the ready position, the control element is transferred from a starting position into a ready position by way of a pivoting of the control element about the first pivot axis;

wherein the control element is designed at least in regions as a cam disk, wherein the cam disk is configured in order to interact with the handle part at least during the return movement of the handle part from the ready position back into the resting position in such a way that a non-uniform sequence of movement is compelled upon the handle part such that, initially during the return movement of the handle part, in a predetermined or determinable period of time, the non-uniform sequence of movement of the handle part is delayed in comparison to a subsequent sequence of movement of the handle part.

2. The actuating apparatus according to claim 1, wherein the blocking and/or delay mechanism is configured in order to compel the non-uniform sequence of movement upon the handle part from the ready position back into the resting position on a purely mechanical basis during the return movement of the handle part.

3. The actuating apparatus according to claim 1, wherein the blocking and/or delay mechanism has a damping device that acts in a motion-dampening or motion-braking manner upon the return movement of the handle part at least temporarily during the return movement of the handle part from the ready position back into the resting position;

wherein the blocking and/or delay mechanism is configured such that the damping device enters, at least temporarily, into an operative connection with the handle part only from a predetermined or determinable position of the handle part in order to act upon the return movement of the handle part in a motion-damping or motion-braking manner.

4. The actuating apparatus according to claim 1, wherein a manipulator is associated with the door lock, said manipulator being transferable between a released position in which the door lock is unlocked and a neutral position in which the door lock is locked, wherein the manipulator associated with the door lock is configured such that it interacts with the control element in its released position, wherein, in the neutral position of the manipulator, the interaction with the control element is suspended.

5. The actuating apparatus according to claim 4, wherein the manipulator associated with the door lock is configured such that it permits, in its released position, the transfer of the control element from the starting position into the ready position but blocks a pivoting or rotating movement of the control element about the first pivot axis that is necessary for the transfer of the control element from the ready position back into the starting position.

6. The actuating apparatus according to claim 1, wherein the gear element or the gear mechanism is configured in order to, upon or after reaching the ready position of the control element, suspend or at least interrupt the coupling or operative connection between the control element and the handle part such that, during a pivoting movement of the handle part about the second pivot axis caused in order to transfer the handle part from the ready position into the actuating position, the control element is not further and/or no longer pivoted about the first pivot axis, wherein the gear element or the gear mechanism is further configured in order to hold the control element in the ready position when the handle part is further pivoted out of the ready position into the actuating position and vice versa upon or after reaching the ready position of the control element; and/or wherein the gear element is configured as a gear element of a slotted control system, or the gear mechanism is configured at least partially as a slotted control system, wherein the slotted control system has a slotted guide in the form of a slotted guide surface, which is configured in order to forcefully guide a slotted region of the handle part, said region being associated with the slotted control system and operatively connected to the handle part, according to the slotted guide.

7. The actuating apparatus according to claim 1, wherein the cam disk has a non-uniform edge region, and wherein the handle part has a lever region fixedly connected to the handle part, which region is configured in order to pick up the movement the non-uniform edge region of the cam disk resulting from a rotation of the cam disk about the first pivot axis during a movement of the control element from the ready position into the starting position, such that the sequence of movement of the handle part is controlled by the control element accordingly during a movement of the handle part from the ready position into the starting position;

wherein the blocking and/or delay mechanism is configured such that a contact between the lever region of the handle part and the non-uniform edge region of the cam disk is suspended upon or after reaching the ready position of the control element.

8. The actuating apparatus according to claim 7, wherein the lever region of the handle part has a guide roller or a guide wheel, via which a movement of the non-uniform edge region of the cam disk is picked up during the movement of the control element from the starting position into the ready position and back, wherein the guide roller or the guide wheel is elastically mounted at least in regions in the lever region of the handle part, such that, when a predetermined or determinable critical force is applied to the guide roller or the guide wheel via the edge region of the cam disk, the roller or wheel can be pressed into the lever region, and/or wherein the guide roller or the guide wheel is mounted at least in regions in the lever region and has an axis as well as an outer roller surface arranged coaxially and/or concentrically to the axis, said roller surface being connected to the axis elastically such that, when a predetermined or determinable critical force is applied to the guide roller or the guide wheel via the edge region of the cam disk, the outer roller surface of the guide roller or guide wheel can be pressed into the lever region at least in regions.

9. The actuating apparatus according to claim 1, wherein the blocking and/or delay mechanism has a braking device associated with the control element, wherein the braking device is configured in order to brake a pivoting movement of the control element during the pivoting about the first pivot axis, wherein the braking device has a rotating damper, which is or can be brought into operative connection with the control element via a gear such that at least a pivoting movement of the control element from the ready position into the starting position is braked, wherein the rotating damper is configured in order to brake rotationally on both sides.

10. The actuating apparatus according to claim 1, wherein the blocking and/or delay mechanism has an overload protection associated with the control element and is configured in order to suspend a contact between a lever region of the handle part and a non-uniform edge region of the region of the cam disk, during a return movement of the handle part from the ready position back into the resting position, when a predetermined or determinable critical force is applied to the handle part.

11. The actuating apparatus according to claim 10, wherein, in order to suspend the contact between the lever region and the control element, the control element is slidable relative to the lever region along a first pivot axis, wherein the non-uniform edge region of the cam disk and an edge region of the lever region of the handle part for picking up a movement of the cam disk are configured to run diagonally such that, upon exceeding critical force that is exerted by the handle part and the lever region on the edge region of the cam disk and is predetermined or determinable, the overload protection is activated and the control element is slid along the first pivot axis relative to the lever region for the suspension of the contact between the lever region and the control element.

12. The actuating apparatus according to claim 1, wherein a biasing element is associated with the handle part for biasing the handle part into the resting position of the handle part, wherein the biasing element is configured as a leg spring; and wherein a further biasing element is associated with the control element for biasing the control element into a starting position of the control element, wherein the further biasing element is configured as a leg spring.

13. A vehicle door having an actuating apparatus according to claim 1 for actuating a door lock of the vehicle door, wherein, in the resting position, the handle part is arranged at least substantially flush with a surface of the vehicle door when the actuating apparatus is installed in the vehicle door, and wherein the handle part, in the ready position when the actuating apparatus is installed in the vehicle door, projects at least in regions further from the vehicle door than in the resting position, wherein the handle part is present in both the ready position as well as the actuating position at least substantially parallel to the outer shell of the vehicle, wherein the handle part is associated with a kinematics for this purpose, which is configured in order to translate a rotating movement generated by an actuator, into a linear movement of the handle part.

14. An actuating apparatus for a door lock of a vehicle door, wherein the actuating apparatus has a handle part that is grippable by a hand, wherein the handle part is configured in order to be transferable between a resting position and a ready position, and wherein the handle part is manually movable into an actuating position proceeding from the ready position and is pivotably or linearly extendable, wherein the actuating apparatus is configured in order to actuate the door lock when the handle part reaches or has reached the actuating position, wherein the actuating apparatus has a blocking and/or delay mechanism, which cooperates with the handle part such that, during a return movement, the handle part is transferable from the ready position back into the resting position only with a time delay and/or only in an at least partially braked or dampened manner;

wherein the blocking and/or delay mechanism has a control element with a non-uniform edge region;

wherein the blocking and/or delay mechanism has an overload protection associated with the control element and configured in order to suspend a contact between a lever region of the handle part and the non-uniform edge region, during the return movement, when a predetermined or determinable critical force is applied to the handle part;

wherein, in order to suspend the contact between the lever region and the control element, the control element is slidable relative to the lever region along a first pivot axis, wherein the non-uniform edge region and an edge region of the lever region of the handle part for picking up a movement of the control element are configured to run diagonally such that, upon exceeding critical force that is exerted by the handle part and the lever region on the non-uniform edge region and is predetermined or determinable, the overload protection is activated and the control element is slid along the first pivot axis relative to the lever region for the suspension of the contact between the lever region and the control element.

15. An actuating apparatus for a door lock of a vehicle door, wherein the actuating apparatus has a handle part that is grippable by a hand, wherein the handle part is configured in order to be transferable between a resting position and a ready position, and wherein the handle part is manually movable into an actuating position proceeding from the ready position and is pivotably or linearly extendable, wherein the actuating apparatus is configured in order to actuate the door lock when the handle part reaches or has reached the actuating position, wherein the actuating apparatus has a blocking and/or delay mechanism, which cooperates with the handle part such that, during a return movement, the handle part is transferable from the ready position back into the resting position only with a time delay and/or only in an at least partially braked or dampened manner;

wherein the blocking and/or delay mechanism has a control element;

wherein the control element is pivotably mounted about a first pivot axis relative to the handle part, wherein the handle part is pivotably mounted relative to the vehicle door about a second pivot axis extending parallel to the first pivot axis, wherein the control element is coupled or operatively connected to the handle part via a gear element or a gear mechanism such that, during a pivoting movement of the handle part about the second pivot axis in order to transfer the handle part from the resting position into the ready position, the control element is transferred from a starting position into a ready position by way of a pivoting of the control element about the first pivot axis;

wherein the gear element or the gear mechanism is configured in order to, upon or after reaching the ready position of the control element, suspend or at least interrupt the coupling or operative connection between the control element and the handle part such that, during a pivoting movement of the handle part about the second pivot axis caused in order to transfer the handle part from the ready position into the actuating position, the control element is not further and/or no longer pivoted about the first pivot axis, wherein the gear element or the gear mechanism is further configured in order to hold the control element in the ready position when the handle part is further pivoted out of the ready position into the actuating position and vice versa upon or after reaching the ready position of the control element; and/or wherein the gear element is configured as a gear element of a slotted control system, or the gear mechanism is configured at least partially as a slotted control system, wherein the slotted control system has a slotted guide in the form of a slotted guide surface, which is configured in order to forcefully guide a slotted region of the handle part, said region being associated with the slotted control system and operatively connected to the handle part, according to the slotted guide.

* * * * *